(12) United States Patent
Hull et al.

(10) Patent No.: US 7,114,699 B2
(45) Date of Patent: Oct. 3, 2006

(54) COMBINATION VALVE AND REGULATION FOR USE WITH PRESSURIZED GAS CYLINDERS, PARTICULARLY OXYGEN CYLINDERS

(76) Inventors: Wendell C. Hull, 3220 Arrowhead St., Las Cruces, NM (US) 88011; Barry E. Newton, 5032 Sun Shadow Pl., Las Cruces, NM (US) 88011

( * ) Notice: Subject to any disclaimer, the term of this patent is extended or adjusted under 35 U.S.C. 154(b) by 161 days.

(21) Appl. No.: 10/644,704

(22) Filed: Aug. 19, 2003

(65) Prior Publication Data
US 2004/0036046 A1    Feb. 26, 2004

Related U.S. Application Data

(63) Continuation-in-part of application No. 09/872,233, filed on May 31, 2001, now Pat. No. 6,607,007.

(60) Provisional application No. 60/460,282, filed on Apr. 3, 2003.

(51) Int. Cl.
F16K 31/50     (2006.01)
F16K 1/00      (2006.01)
F16K 1/30      (2006.01)

(52) U.S. Cl. .................... 251/121; 251/267; 251/274

(58) Field of Classification Search ............. 137/614.2; 251/121, 265, 266, 267, 274, 276, 282, 357, 251/368, 900
See application file for complete search history.

(56) References Cited

U.S. PATENT DOCUMENTS

| | | | |
|---|---|---|---|
| 270,353 A * | 1/1883 | Waddell .................. 251/357 |
| 368,073 A | 8/1887 | Convert | |
| 1,510,528 A | 10/1924 | Sebenste | |
| 1,662,291 A | 3/1928 | Bastian .................. 251/274 |
| 1,772,406 A * | 8/1930 | Whiton .................... 251/282 |
| 2,270,932 A * | 1/1942 | Cornelius ................ 251/357 |
| 3,007,674 A * | 11/1961 | Lorenz et al. ........... 251/357 |
| 3,085,783 A | 4/1963 | Pulling | |
| 3,458,170 A | 7/1969 | Vogeli ..................... 251/122 |
| 3,503,585 A | 3/1970 | Vogeli ..................... 251/121 |
| 3,511,470 A * | 5/1970 | Beckett et al. ........... 251/121 |
| 3,589,671 A | 6/1971 | Strache ..................... 251/83 |
| 3,911,948 A | 10/1975 | Collins, Jr. et al. ..... 137/505.42 |
| 3,918,484 A | 11/1975 | Lamb | |
| 3,951,381 A | 4/1976 | Whitener | |
| 3,976,279 A * | 8/1976 | Walker ..................... 251/267 |
| 4,139,469 A | 2/1979 | Rainin et al. ............ 210/136 |
| 4,157,808 A * | 6/1979 | Eidsmore .................. 251/121 |
| 4,211,386 A | 7/1980 | Yocum et al. ............ 251/122 |
| 4,228,821 A | 10/1980 | Stark ..................... 137/533.11 |
| 4,445,532 A | 5/1984 | Mitchell ................... 137/495 |
| 4,535,806 A | 8/1985 | Ottung ..................... 137/493.6 |
| 4,637,426 A | 1/1987 | Lyon ........................ 137/433 |
| 4,735,229 A | 4/1988 | Lancaster .................. 137/375 |
| 4,799,646 A | 1/1989 | Rollett ...................... 251/264 |
| 4,967,814 A | 11/1990 | Day, Jr. ..................... 141/286 |
| 5,392,825 A | 2/1995 | Mims et al. | |
| 5,474,104 A | 12/1995 | Borland et al. ........... 137/381 |
| 5,878,992 A | 3/1999 | Edwards et al. .......... 251/122 |
| 5,904,178 A | 5/1999 | Bracey et al. ......... 137/505.42 |
| 6,102,367 A | 8/2000 | Schmitz et al. ........... 251/265 |
| 6,607,007 B1 | 8/2003 | Hull et al. ................. 137/613 |

* cited by examiner

Primary Examiner—John Rivell
(74) Attorney, Agent, or Firm—Rod D. Baker

(57) ABSTRACT

A valve apparatus, and combined valve-regulator apparatus, for safely regulating the flow of combustible gases such as oxygen.

41 Claims, 10 Drawing Sheets

COMBINATION VALVE AND REGULATION FOR USE WITH PRESSURIZED GAS CYLINDERS, PARTICULARLY OXYGEN CYLINDERS

CROSS-REFERENCE TO RELATED APPLICATIONS

This application is a continuation-in-part application of U.S. patent application Ser. No. 09/872,233, entitled "Cylinder Valve and Bayonet Check Filter with Excess Flow Protection Feature", filed May 31, 2001, issued as U.S. Pat. No. 6,607,007, and the specification thereof is incorporated herein by reference.

This application also claims the benefit of the filing of U.S. Provisional Patent Application Ser. No. 60/460,282, entitled "Combination Valve and Regulator for Use with Pressurized Gas Cylinders, Particularly Oxygen Cylinders," filed on Apr. 3, 2003 and the specification thereof is incorporated herein by reference.

BACKGROUND OF THE INVENTION

1. Field of the Invention (Technical Field)

The present invention relates to valves and regulators for controlling the flow of fluids, particularly gases, and more specifically to valves for more safely regulating the flow of oxygen gas.

2. Background Art

Oxygen is widely used in many medical and industrial applications. When a portable source of oxygen is required, it is almost universally supplied in the form of molecular oxygen ($O_2$) under pressure in a cylindrical steel or aluminum container. Oxygen also commonly is transported in such cylinders. The cylinders are equipped with a valve, used to open and close the cylinder for emptying and refilling. A pressure regulator often also is attached to the cylinder valve.

Oxygen cylinder valves, as they exist today, have been implicated in numerous fire incidents with sometimes catastrophic results. When a cylinder valve seat ignites, the attached regulator or manifold system is subjected to strong kindling chain mechanisms that will often lead to fires downstream of the cylinder valve.

The "plug type" cylinder valves presently in common use comprise a rotating threaded seat plug that translates due to the rotation of a hand wheel mounted on the top of the valve itself. The plug incorporates a relatively large nonmetallic seat. The seat is subjected to strong flow impingement during oxygen gas discharge from the cylinder, due to the seat's orientation above the valve nozzle. Further, due to the rotating seat mechanism, the seat often is subjected to strong frictional interference with the valve nozzle. Both of these features are undesirable to prudent persons aware of the fire hazards of handling oxygen cylinders. Conventional known valves are also "dirty," generating large amounts of undesirable debris due to their mode of operation (i.e., rotating seat and threads in the oxygen wetted portion of the valve). This debris often deposits in the nonmetallic seat itself and increases the frictional interactions during valve opening and closing.

These valves most often utilize a nylon main seat although both polyphenylene oxide (PPO) and polychlorotrifluoroethylene (PCTFE) are also utilized. Both nylon and PPO exhibit poor to moderate compatibility based on present oxygen-compatibility rating test standards, and deliver a large amount of energy if ignited. PCTFE is considered an oxygen compatible material, but has a compressive modulus that is insufficient to withstand the torques that are often applied by the manual closing of conventional valves. As a result, PCTFE seated plug-valves often exhibit significant extrusion and recently have been implicated in a large number of fires. The extruded seat increases the surface-area-to-volume ratio for oxygen gas impingement during discharge, and is believed to greatly increase vulnerability of the seat to hazardous flow friction ignition. Further, many of the materials in use with known valves seats generate highly toxic gases when they burn.

There also is a need for an apparatus that combines the function of on-off valving with the flow adjustment capabilities of a flow regulator.

The present invention is an advance over the Applicant's previous valve invention, which is described in pending U.S. patent application Ser. No. 09/872,233, entitled "Cylinder Valve and Bayonet Check Filter with Excess Flow Protection Feature", filed May 31, 2001, now allowed. References herein to the "original design," "original apparatus," or "original device," are to the apparatus disclosed in U.S. patent application Ser. No. 09/872,233, which is incorporated herein by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figures 1, 1A:
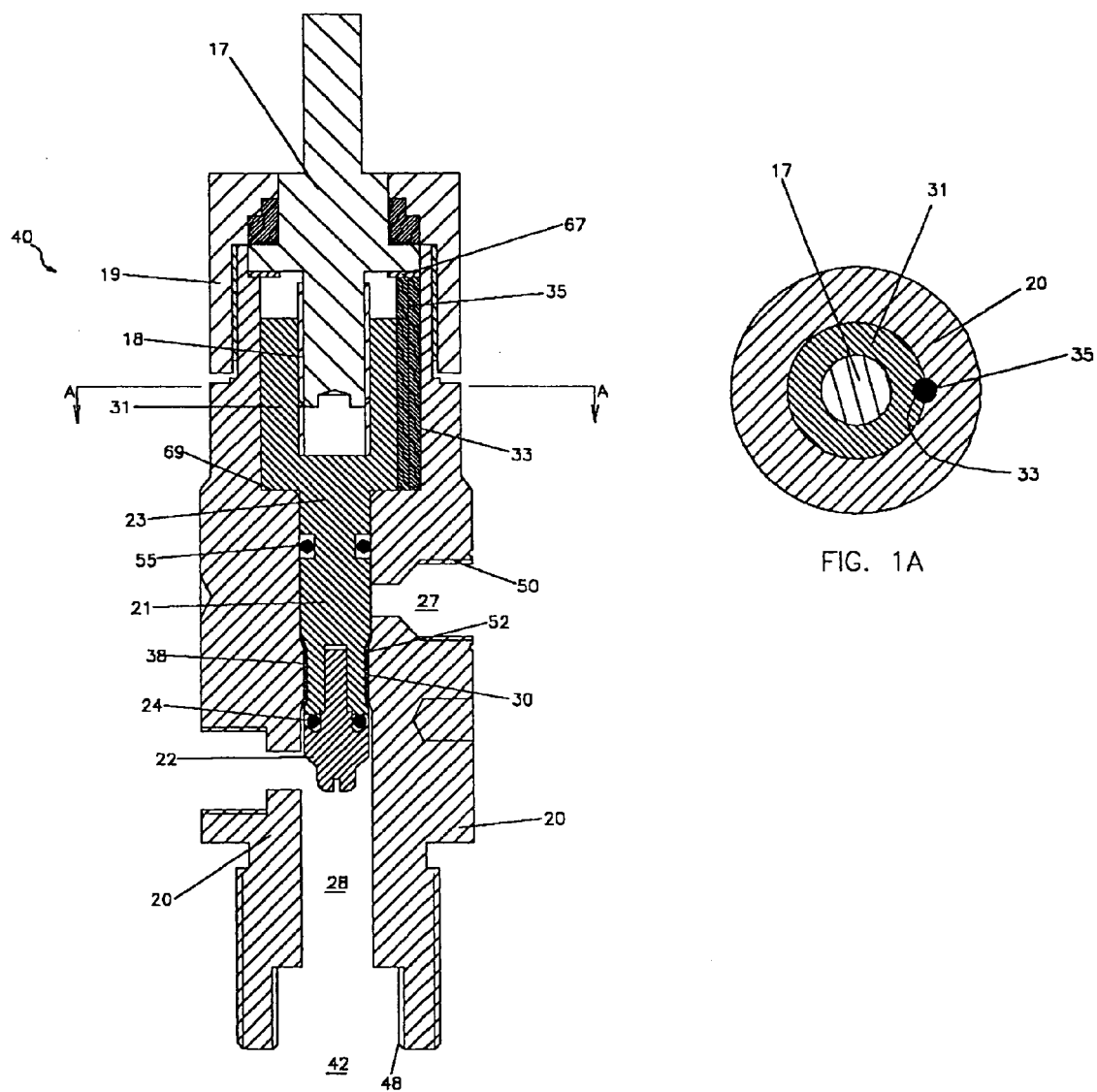
FIG. 1 is an axial (side) sectional view of one embodiment of the apparatus according to the present invention.
FIG. 1A is a radial sectional view of the embodiment of the apparatus shown in FIG. 1, taken along section line A—A in FIG. 1.

DESCRIPTION OF THE PREFERRED EMBODIMENTS (BEST MODES FOR CARRYING OUT THE INVENTION)

The inventive valve-regulator apparatus ameliorates vulnerability to the common ignition mechanisms that are observed in oxygen systems. The invention satisfies the recommended design criteria that have been established in standards such as ASTM G88, "Design Guide for Oxygen Systems," ASTM G128, "Control of Hazards and Risks in Oxygen Enriched Systems," ASTM G63, "Evaluating Nonmetallic Materials for Oxygen Service," and ASTM G94, "Evaluating Metals for Oxygen Service." The ignition mechanisms that are specifically eliminated by the design features of the present invention are adiabatic compression, flow friction/flow erosion, particle impact, mechanical impact, frictional heating, and kindling chain/promoted ignition. Before disclosing specifics of the invention, its design advantages are discussed generally.

The design of the apparatus ensures that the main seat is protected from the discharge flow and is not subject to "flow impingement." This reduces seat ignition mechanisms such as flow friction and flow erosion. The seat design utilizes an o-ring seal or plastic seal that is located under the nozzle to be fully protected from the high-velocity discharge flow. O-ring seals are not commonly found in known cylinder valve designs, but offer superior performance qualities to plug type plastic seat, for long life and forgiving operation. The seat of the present design, however, can utilize either an o-ring seal or a molded plastic seal; in either case, the seat/seal is located below the nozzle, for superior protection from flow-induced dynamics, rather than above the nozzle as in other cylinder valve designs, which is the worst possible orientation for flow induced ignition potential. Presently known cylinder valve designs, for oxygen service, locate the seat/seal above the nozzle, and ignition of the seat due to this orientation has been implicated in a number of oxygen valve fires.

The inventive design in contrast to presently known cylinder valve designs ensures that all throttling or choked flow of the oxygen during discharge, or charging flow, occurs at a metal-to-metal interface. During discharge flow, the throttling occurs downstream of the seat, rather than across the nonmetallic element of the seat, as in the current plug-type valves. During charging flow, the throttling occurs upstream of the seat, but still at a metal-to-metal interface. This design feature reduces ignition potential by "flow erosion/friction," which can be very severe for non-metallic surfaces.

Also, the design of the present valve apparatus permits the apparatus to serve as a highly controllable regulator. In the preferred embodiment, discharge or pressure through the apparatus can be regulated, in addition to the on-off valving function.

In the present valve, no packing is present; rather, a dynamic seal design is used for greater sealing efficiency at high pressure, regardless of the stem location. The valve stem is specially configured to trap and protect the o-ring to prevent ballooning or other deformation of the ring under pressure.

Preferably, the metals and nonmetals from which the invention is fabricated exhibit the best oxygen compatibility and histories of use for materials utilized in oxygen service. In the preferred embodiment, such materials are consistent with the guidelines provides in ASTM G63 and ASTM G94.

It should be understood that the valve-regulator of the present invention is suitable for use with any gas whose flow is to be controlled by the operation of a valve. However, the apparatus is particularly well-suited to improve the safety of valved and regulated flow of any gas, including many hazardous or combustible gases. Also, it is to be noted that the valve according to the invention is adapted for use upon the commonly encountered conventional cylinder gas containers. Thus, it may be employed in the "aftermarket" to be installed upon existing cylinders to improve safety. Alternatively, the apparatus may be manufactured and sold as original equipment manufacturer product accompanying new cylinders.

The invention offers a valve-regulator combination, the valving-regulating functions accomplished simultaneously by the same components, while maintaining positive valve opening/closure, and fast fill and discharge as required. The apparatus can be equipped with various outlet connections, such as variable pressure or flow regulation, or adjustable flow discharge. A valve-regulator combined function is achieved using a high-pressure balanced stem and "interstage" pressure zone within the valve body. The configuration minimizes droop/creep at all pressures, including high pressure. The balanced stem keeps adjustment forces low, even for high pressures. Top loading of all components and interchangeability of parts between valve components and valve/regulator components improves the versatility and maintenance of the apparatus.

A significant feature of the apparatus is the design permitting the use of o-rings manufactured of PCTFE and other oxygen-compatible materials. The apparatus is configured to provide a specialized seat squeeze and capture, so that the potentially vulnerable o-ring performs a necessary sealing function without ballooning or extruding during operation of the apparatus. A marked advantage is the incorporation of an o-ring seat that it is comparatively oxygen-compatible and yet protected from deleterious impacts and abrasions. The nonmetallic oxygen-compatible polymer materials are protected from overload by physical stops, and are not overstressed by design. Known "plug style" designs do not protect critical soft-goods, and almost ensure overload during use. In contrast, the apparatus of the invention does not overstress non-metallic materials so all materials can be chosen based on superior compatibility with the regulated fluid.

Some of the most oxygen-compatible materials (e.g., Teflon®) also produce toxic combustion products if burning. The apparatus minimizes ignition probability by protecting nonmetallic materials; again, allowing the most compatible materials to be used, but also minimizing the size/quantity of polymeric components. By inhibiting ignition, the apparatus hinders the delivery of toxic products to downstream breathing systems in the unlikely incidence of polymer ignition.

Furthermore in the event of accidental ignition, the post-ignition reaction in this apparatus is lower since this is an inherent property of the more compatible nonmetallic materials. Present "plug style" designs use nonmetallic materials having high heats of combustion and energy release to promote ignition of attached components. The invention features compatible metal/nonmetallic materials that burn slowly and release low amounts of energy.

Another significant feature of the invention is an improved "two point guidance" configuration. The inventive apparatus is configured to provide guidance for the axially movable stem at both the upper and lower sections of the stem. By such guidance, the o-ring seat is smoothly moved into and out of the nozzle portion of the apparatus with minimized risk of o-ring abrasion. Further, the two-point guidance prevents deleterious stem flutter during operation.

The configuration of the stem also increases turbulence and heat rejection for rapid pressurization compression heating, thus avoiding combustion of the seat.

The invention also features an advantageously long-radius nozzle transition, which is complementary with the captured o-ring feature and two-point stem guidance to permit the use of potentially fragile, but oxygen-compatible, materials in the o-ring seat.

Yet another advantageous feature of the apparatus is an innovative anti-rotation component, such as an axial guide pin, that promotes positive guidance of the lower stem while preventing undesirable stem rotation at all positions of the stem, i.e., through the range of the valve movement.

The inventive valve is designed to maximize the safety for users by decreasing the known ignition mechanisms normally active in oxidizing gas service. Adiabatic compression due to reverse flow is minimized by a reversed bore in the outlet of the valve to restrict flow entering the valve, and a stem design that increases turbulent mixing which reduces compression heating (verified by thermal imaging in prototype testing by Applicants). Flow friction hazards are minimized, since the apparatus does not subject nonmetallic materials to direct flow impingement, thus reducing seat stress and heating. Promoted combustion is also minimized, due to the close tolerance between internal stem and nozzle, to further restrict/protect reverse flow (including combustion flow) from the nonmetallic seat.

The foregoing advantages allow use of the invention in high-pressure applications, since molded seats and/or alternate non-extrusion materials can be employed, and the apparatus maintains superiority of seating condition for all pressures. Indeed, the seat is configured to be pressure-actuating, so it seals better at higher pressure.

Of great importance is that the design allows for the use of the compatible polymers (i.e., PTFE Teflon®, CTFE Neoflon®, Viton®), whereas up until now these more compatible polymers could not be utilized due to the loading demands required by the plug style designs. These plug style designs normally overload the nonmetallic material seats, and therefore only the most mechanically strong softgoods (but low compatibility) have historically been used. The invention allows the most compatible material to be used in components such as o-rings, and does not overload the materials by design. One great advantage of using the more compatible polymers is the significantly lower risk of ignition and the lower energy release if they do ignite.

The invention minimizes or eliminates the three most common ignition mechanisms (adiabatic compression, flow friction, and promoted combustion) by its design. Thus, the apparatus is safer from a design standpoint as well as utilizes more compatible materials in general, as compared to other similar devices on the market.

The ignition mechanism of adiabatic compression is due to the heating that occurs when a gas is rapidly compressed. The inventive apparatus is very slow opening and therefore rapid compression downstream does not occur. For rapid compression of reverse flow gases (like during cylinder filling operations), the design provides high heat rejection due to the metallic elements in the design configuration and also induces turbulent mixing as gas is entering the valve. This mixing increases heat rejection.

The apparatus reduces flow friction. During opening transients, the inventive valve deliberately locates the vulnerable nonmetallic material comparatively remotely from regions of high flow, which flow results in hot and cold spot generation in currently known "plug style" designs. In conventional plug style devices, the impingement of flow directly on the nonmetallic plug seat causes hot spot formation in the center of the plug and cold regions on the exterior circumference of the plug, where the flow is expanding. Both experience in the field and the Applicants' CFD analysis confirmed this behavior.

Attention is invited to FIG. 1, showing a longitudinal cross-section of a basic embodiment of the apparatus. The apparatus 40 has a generally cylindrical hollow body 20 with a central longitudinal axis. The body 20 is manufactured from any suitable material, such as brass or stainless steel, known to the industry. Defined by and within the body 20 are the lower or first chamber 28 and the upper or second chamber 27. The valve-regulator 40 is used for controlling the flow of a gas from a high-pressure zone 42, such as the interior of a cylinder container (not shown) to a zone of lower pressure 43, such as a tube or conduit (also not shown) sealably attached to the outlet port 50. It is understood that the valve-regulator 40 can control fluid flow in a reversed direction as well, i.e., when the zones of high and low pressure are reversed as when pressurizing a closed cylinder. The first chamber 28 preferably is a generally cylindrical conduit that opens to, or is in fluid communication with, the high pressure zone 42 via intake port 48. The upper or second chamber 27 is in fluid communication with the zone of lower pressure 43 by way of outlet port 50.

A stem 21 is disposed in the hollow axial bore defined by the body 20 and adjacent the second chamber 27. The stem 21 is of two-piece construction, having a distal stem portion 22 screwed into a proximate stem portion 23. The seat 24 is an annular o-ring, and is attached to stem 21 by being captured between the two separable portions 22, 23 of the stem and is contactable with the nozzle 30 to seal the nozzle passage 52 against the passage of gas, as further described herein. The o-ring seal 24 may be fashioned from an oxygen compatible material such as PTFE Teflon®, CTFE Neoflon®, or Viton® polymers.

The handle 17 has a threaded portion 18 that has a screwed engagement with the correspondingly threaded proximate stem 23. The uppermost part of the proximate portion 23 of the stem 21 has an enlarged diameter, and defines a cylindrical barrel 31 therein, the inside wall of which is threaded to correspond to threads on the lower end of the handle 17. The lower end of the handle screws into the barrel 31 of the stem 21 as seen in FIG. 1. The handle 17 is fixed against axial movement within the handle-engaging portion 19 of the body, but is free to rotate about the axis of the body 20. Due to the screwed engagement of the threaded portion of the handle 17 with the proximate portion of the stem 21, rotation of the handle 17 either pushes or pulls the stem 21 axially within the valve bore.

Referring to both FIGS. 1 and 1A, it is seen that a small axially directed hole 33 is provided at the interface of the barrel portion 31 of the stem 21 and the inside wall of the body 20; such a hole 33 may be provided as by machining semi-cylindrical grooves in the proximate stem portion 23 and the body 20 interior wall. The grooves have a common diameter, so that when radially aligned they define the axial hole or channel 33 for receiving and holding a rod-shaped guide pin 35 of corresponding diameter. The presence of the guide pin 35 mated with the grooves in the barrel 31 of the proximate stem 21 and body 20, respectively, prevents the proximate portion 23 of the stem 21 from rotating, and yet permits the stem to shift up and down smoothly in sliding contact with the body 20. The threads of the barrel 31 and of the threaded portion of the handle 18 are fine, with a low pitch (e.g. $\frac{5}{16}$–24), such that the rotation of the handle 17 results in a slow, gradual, movement of the stem 21.

The handle 17 thus is rotatable (either clockwise or counterclockwise) within the cavity in the body 20, so that when the handle is rotated, the stem 21 does not rotate. The rotary motion of the handle 17 therefore is not imparted to the stem 21. However, as the handle 17 rotates, the stem 21 shifts axially due to its screwed engagement with the handle 17.

The longitudinal travel of the stem 21 preferably is controlled by contact of the larger-diameter barrel 31 of the stem 21 with an upper close stop 67 or with the lower open stop 69 on body 20. For example in FIG. 1, the stem barrel 31 has contacted the lower "open" stop 69, preventing the stem 21 from moving any further downward, thereby indicating a "full open" condition. Similarly, when the handle 17 is rotated to draw the stem axially upward, the barrel 31 eventually will contact the upper close stop 67, preventing the stem 21 from traveling any further upward (and thus preventing damage to the seat 24) and indicating a "full closed" condition.

Consequently, when the handle 17 is rotated, only the handle rotates about the valve axis in relation to the body and in relation to the stem 21. As the handle rotates, the axial shifting of the barrel 31 causes the entire stem 21 to shift axially a corresponding amount, as the handle during clockwise rotation "pushes" the stem down into the valve body 20, and during counterclockwise rotation "pulls" the stem up or from the valve body. Contact between the stem 21 and the body 20 is a smooth sliding contact, generating little or no debris from surface abrasion. Rotation of the handle 17 in the handle-engaging portion 19 controllably moves the non-rotating stem 21 axially to move the seat 24 into and out of contact with the nozzle 30 thereby closing and opening the passage 52 to the flow of gas.

Advantageously, any debris generated by the repeated screwed movement of the handle 17 in the proximate portion 23 of the stem is trapped and collected in the interior of the barrel 31. The debris thus is prevented from entering the wetted zones of the valve 40 where it poses a combustion hazard.

Figure 2:
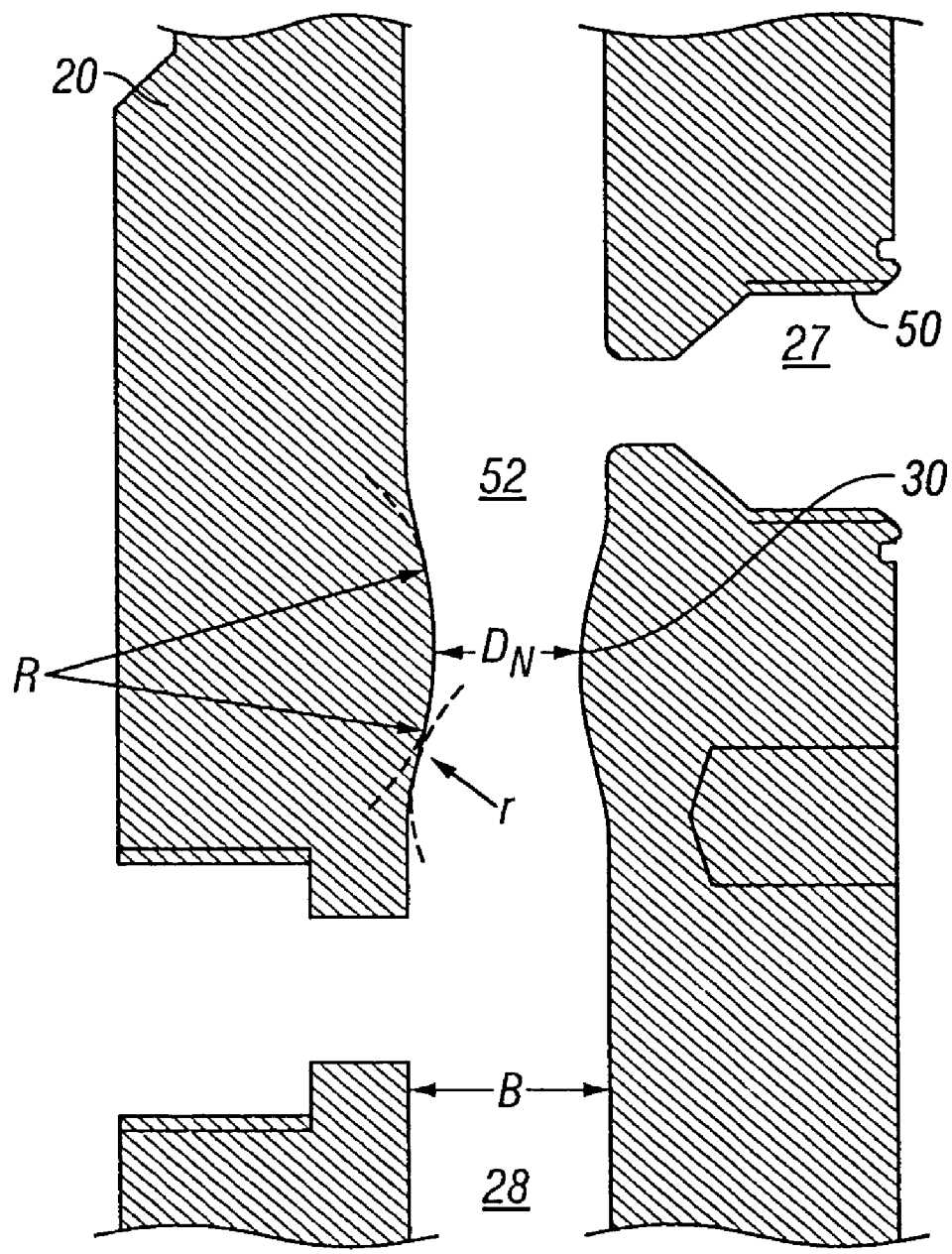
FIG. 2 is an enlarged, axial, sectional view of a medial portion of the apparatus shown in FIG. 1, with the stem component removed and illustrating the configuration of the nozzle passage of the apparatus.

FIG. 2 is an enlarged view of a medial portion of the body 20 the apparatus 40 showing the special configuration of the nozzle 30. The nozzle 30 is within the body 20 and preferably is machined or otherwise formed integrally with the body. The nozzle separates the chambers 27, 28 and has a high-pressure side adjacent the first chamber 28, a low-pressure side adjacent the second chamber 27. Unlike conventional valves, the valve-regulator 40 according to the invention has a nozzle 30 that lacks an abrupt, well-defined orifice; rather the nozzle 30 is defined by a very long radius transition. Progressing downward from the upper chamber 27, the nozzle 30 constricts very gradually to a defined annulus of minimum diameter $D_N$, then progressing further downward toward the lower chamber 28, has gradually diverging walls to open toward the zone of higher pressure. It is seen therefore, that a convexly curved interior wall of the body defines the nozzle 30. The nozzle 30 defines the constricted passage 52 for the flow of gas between the chambers 27, 28.

A characteristic of the nozzle 30 is the gentleness of its curves. In one embodiment, the nominal diameter B of the bore is approximately 0.235 inches. The wall of the passage 52 is defined by a long-radius concave curve with a radius R of, for example, approximately 0.5 inches ±5%, as seen in FIG. 2. Short-radius transitions, where the passage walls join with the cylindrical wall of the bore, are defined by convex curves of radius r, also as shown in FIG. 2. For a long radius R of 0.50 inches, the short radius r may be approximately 0.3 inches ±5%. In a preferred embodiment having a long radius R of approximately 0.5 inches, the nozzle minimum diameter $D_N$ is approximately 0.208 inches ±5%. Preferably, the ratio of long radius R to the nozzle minimum diameter $D_N$ accordingly is, therefore between 2.53 and 2.27 to 1. These dimensions are offered by way of example, rather than limitation, but may serve as proportional standards for the configuration of larger or smaller versions of the apparatus. Further, most known valves have substantially smaller transition radius to orifice diameter ratios.

One advantage of the gentleness of the transitional curves of the nozzle 30 is realized during the assembly of the apparatus 40. Referring to FIGS. 1 and 2, the valve 40 is assembled from the top, i.e., the fully assembled stem 21 is lowered into the valve bore from the opening in the top of the body 20 (with handle 17 removed). The upper large radius of curvature of the nozzle 30 facilitates installation of the stem 21 without ripping or scuffing the seat 24. The careful insertion of the stem 21 into the bore poses little risk of damage to the seat 24, as the gradual profile of the nozzle 30 is unlikely to cut or damage the seat.

The lower large radius of nozzle curvature offers the advantage of a high level of flow control during the transition, on a first or return stroke, between an open and a closed, or a closed and an open, valve condition. The gradual character of the nozzle 30 profile permits the transitional area in flow to be minutely adjusted by the apparatus operator.

Figure 3A:
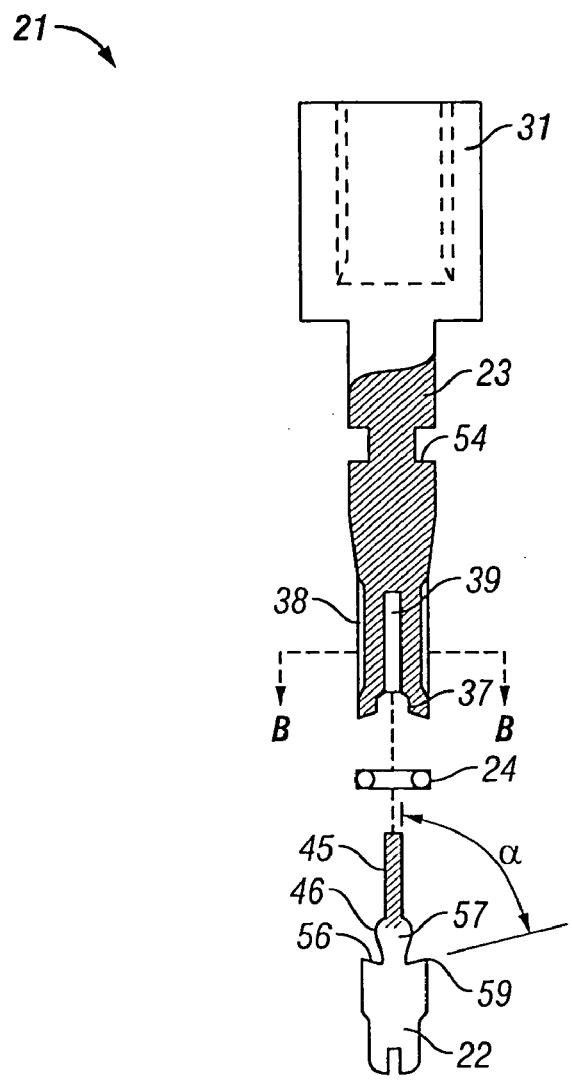
FIG. 3A is an enlarged exploded and partially sectional view of components of the stem of the apparatus shown in FIG. 1.
Figure 3B:
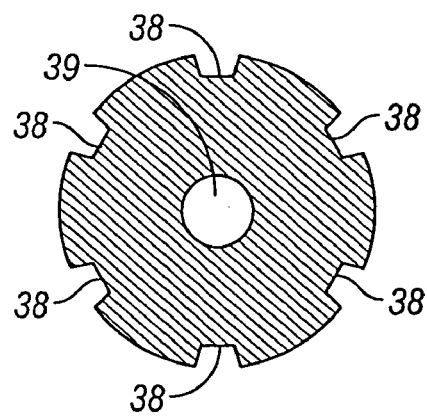
FIG. 3B is an enlarged radial section of the proximate stem portion seen in FIG. 3A, taken along section line B—B in FIG. 3A.

FIGS. 3A and 3B depict the details of the stem 21. The stem 21 has the upper or proximate portion 23, and the lower or distal portion 22. Proximate portion 23 defines in its upper end the threaded barrel 31 into which the handle assembly is screwed, as described previously. Also defined in the proximate portion 23 is the circumferential groove 54 for receiving and retaining the o-ring seal 55 seen in FIG. 1. The lower shaft of the proximate portion 23 is milled or otherwise machined to have a plurality, preferably six, equidistantly spaced, axial stem flow grooves 38, as best seen in FIG. 3B. These grooves 38 are provided to permit adequate gas flow area between the stem 21 and body 20 during valve operation, despite the very close tolerances between the outside diameter of the stem 21 and the inside diameter B of the bore defined in the body 20. In one embodiment, the stem grooves 38 are about 0.0625 inches wide, and 0.017 inches deep, with the ends of the grooves rounded at 0.0625 inches radius to foster fluid flow into and out of the grooves. The axial screw socket hole 39 is threaded (e.g. #1–64) to permit the correspondingly threaded stock 45 of the distal portion 22 to be securely screwed therein. It also will be understood by one of ordinary skill in the art that another means, besides channel grooves, may provide the gas flow area in the stem. For example, the proximate portion 23 of the stem may have a certain segment of its length defined by a polygonal cross section (e.g., hexagon or octagon, which may be more affordably machined), and whereby the gas flow is between the planar faces of the polygonal stem while the edges thereof have the close tolerances adjacent to the nozzle wall to prevent lateral stem shifting.

The lowermost end of the proximate stem portion 23, the annular terminus surrounding the opening of the axial hole or socket 39, is chamfered inwardly so as to define a concavity sloping upward toward the hole 39, as indicated in the figures. The angle of the chamfer is not critical, but preferably is between about 20° and about 50° (from the stem's axis). This chamfered or inclined aspect of the terminus of the proximate stem portion 23 is devised to cooperate with a part of the distal stem portion 22 to effectively but gently trap the seat 24, as shall be further explained. Near the terminus of the proximate stem portion 23, between two adjacent stem flow grooves 38 a minute vent hole 37 is drilled radially from the outside of the stem 23 to the screw hole 39; the vent hole 37 vents the interior of the o-ring seat 24 when the entire stem 21 is fully assembled and installed in the valve 40.

The distal stem portion 22 has threaded stock 45 and shoulder 46 which permit the distal stem portion 22 to be securely, but reversibly, connected to the proximate stem portion by tightly screwing the stock 45 into the socket 39 until the shoulder 46 abuts the lower end of the proximate stem portion 23.

The remaining features of the distal stem portion 22 are carefully crafted to accommodate and protect the seat 24. As suggested by FIG. 3A, the o-ring seat 24 is slipped over the stock 45 and gently pushed up and over the shoulder 46 to be situated in the annular pocket 56 defined in the stem 22. The pocket 56 is a depression circumferentially about the distal stem portion 22; the trunk 57 has a diameter somewhat less than the interior diameter of the o-ring seat 24. The bottom of the pocket is defined by an angled ledge 59 which has a reverse angle of angle $\alpha$; in the preferred embodiment $\alpha$ is an angle of approximately 70°.

Figure 4:
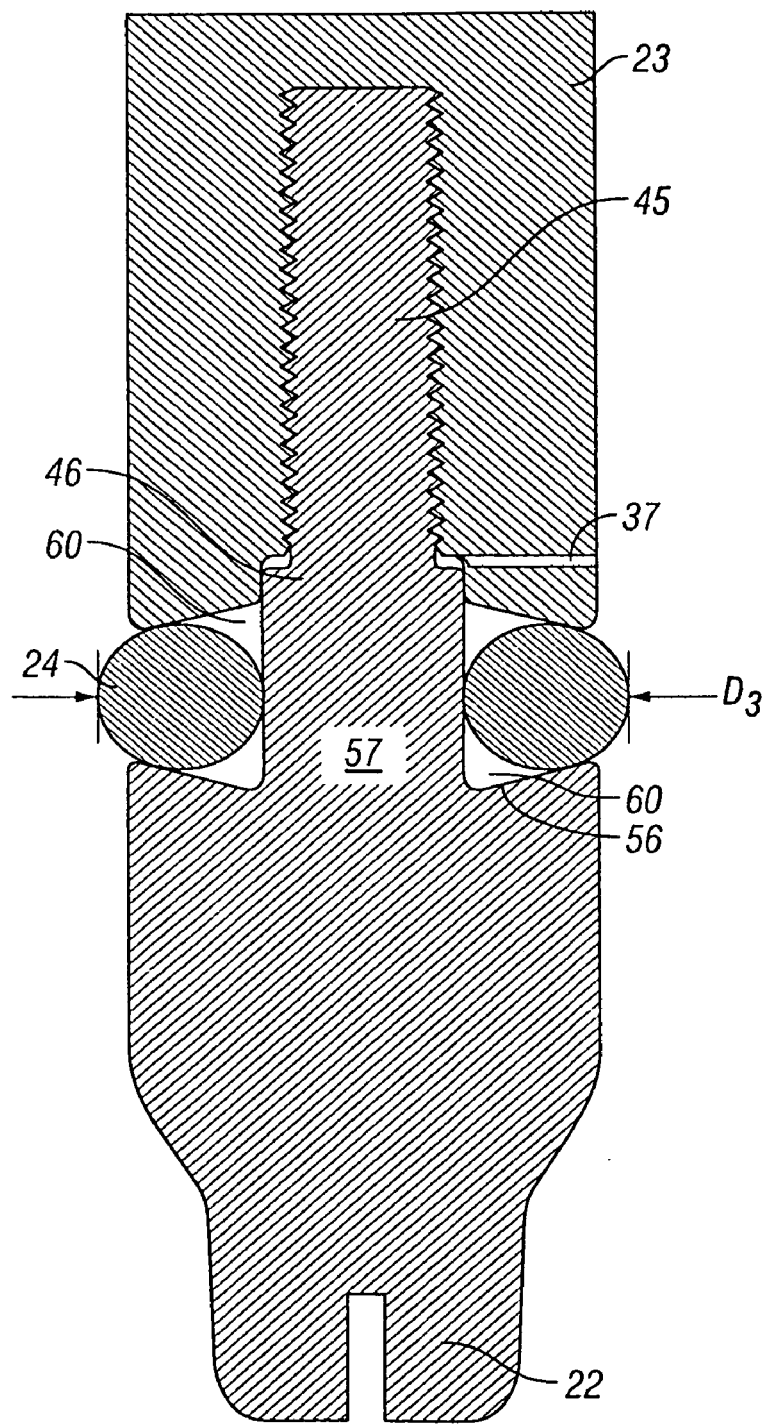
FIG. 4 is a further enlarged view of the components seen in FIG. 3A, shown in a properly assembled condition.

FIG. 4 is a much enlarged view of the union of the two parts 22, 23 of the stem 21 to capture and protect the seat 24 there between. The lowermost, chamfered, end of the proximate stem portion 23 and the angled upper end of the distal stem portion 22 combine to define the cavity or pocket 56 in which the seat 24 is disposed. An advantage of the invention is that the stock 45 has a length, and the shoulder 46 is so located, that when the stock is fully screwed into the proximate stem portion, the seat 24 is captured within the pocket 56 and only gently gripped within the stem 21 so as to expose outside the stem's confines a modest part (e.g. less than one third (33%), and preferably less than one-fourth (25%)) of the toroidal (cross-sectional) circumference of the seat. IN the preferred embodiment, therefore, at least 66%, and more preferably at least 25%, of the total surface area of the o-ring seat 24 is enclosed and protected by the confines of the pocket 56, and a preferred maximum of 33% of the 0-ring seat's exterior surface is exposed outside the imaginary cylinder defined by the exterior surfaces of the stem 21.

Further, the pocket 56 is configured to have an axial cross section about 7% to about 10% larger than that of the seat 24, so that when the seat is installed in the stem (but in the absence of any valved flow), a void 60 is provided in the interior of the pocket 56 between the seat and the stem 21. This void 60 is a relief volume that permits the seat 24 to shift radial inward, when radial pressure is applied to the seat (for example, when the valve-regulator 40 is fully closed, or during installation of the stem 21 into the body 20). Permitting the seat 24 to elastically flex inward as needed aids in protecting the seat from damage.

Further referring to FIG. 4, it also is observed that the squeeze applied to the seat 24 by the screwed engagement of the fully connected stem portions 22, 23 causes the seat to bulge radial outward so that the seat diameter $D_s$ slightly exceeds the nominal diameter of the stem 21 itself. For example, in one preferred embodiment having a nominal stem diameter of 0.206 inches, the seat diameter $D_s$ is from approximately 0.224 inches to approximately 0.232 inches. The modest amount of seat 24 protruding beyond the confines of the stem pocket 56 permits the seat to be fully functional as a sealing element, yet the bulk of the seat remains protected. In the event potentially damaging excess physical force is imposed inwardly on the seat, it can retract into the void 60 rather than tearing or rupturing under the force. The stem vent hole 37 nevertheless promotes equalization of pressures between the exterior of the stem 21 and the interior void 60 within the pocket 56.

Figure 5:
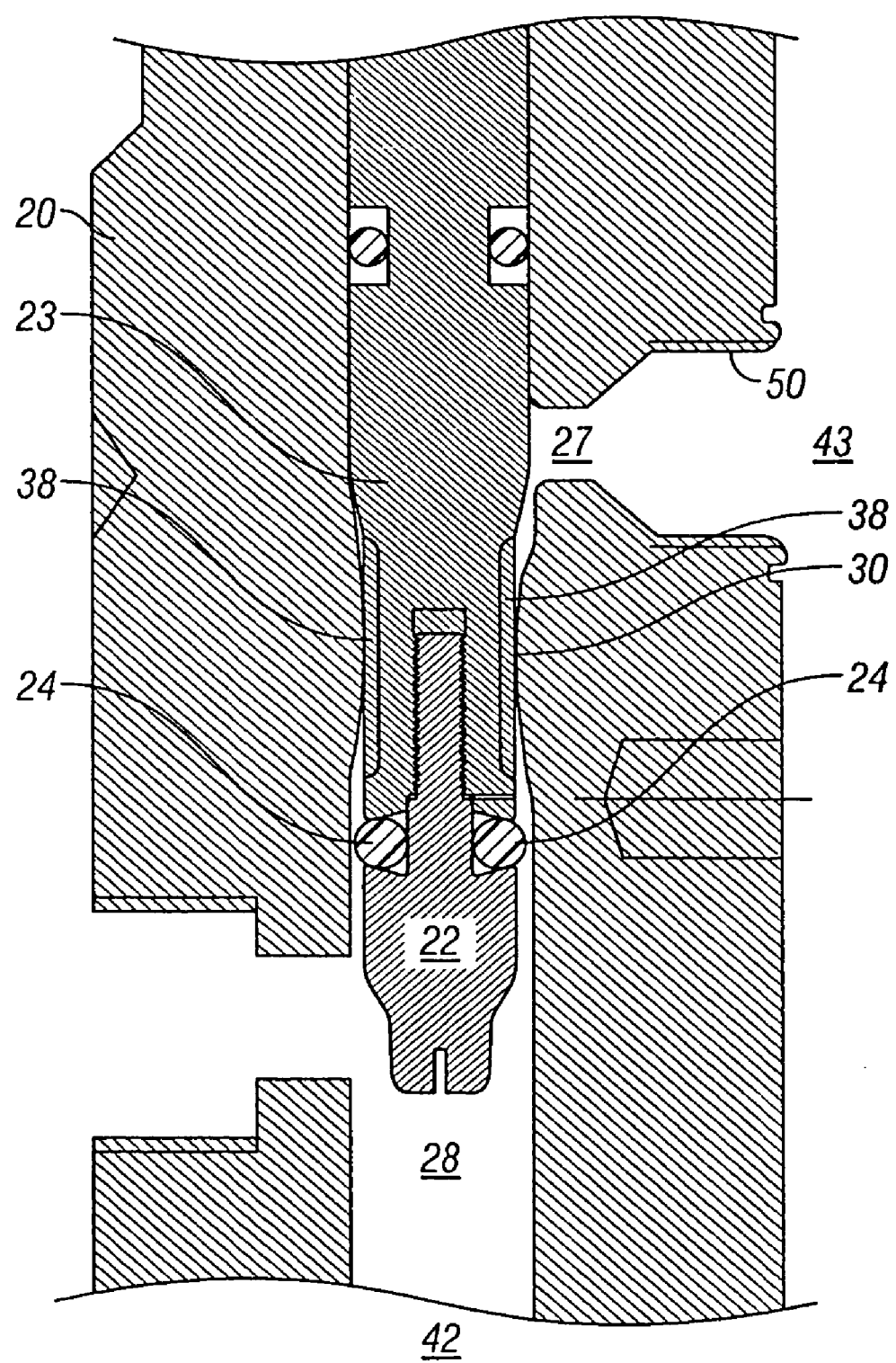
FIG. 5 is an enlarged axial sectional view of a medial portion of the apparatus seen in FIG. 1, showing the stem in an open position within the body of the valve.

FIG. 5 shows is an enlarged view of the portion of the body 20, in the region of the nozzle 30, seen in FIG. 1, with the stem 21 situated in a full open condition. In the open position, gas passes from the high pressure zone 42 past the distal portion 22 of the stem, past the seat 24, and into the stem grooves 38. The stem grooves 38 permit the gas to flow through the passageway 52 (FIG. 2) of the nozzle 30, between the proximate portion 23 of stem 21 and the wall of the body 20. The very close tolerance between the exterior circumference of the stem portion 23 nevertheless is maintained at the surface of the stem portion 23 between the grooves 38, maintaining the two-point stem guidance advantage.

Figure 6:
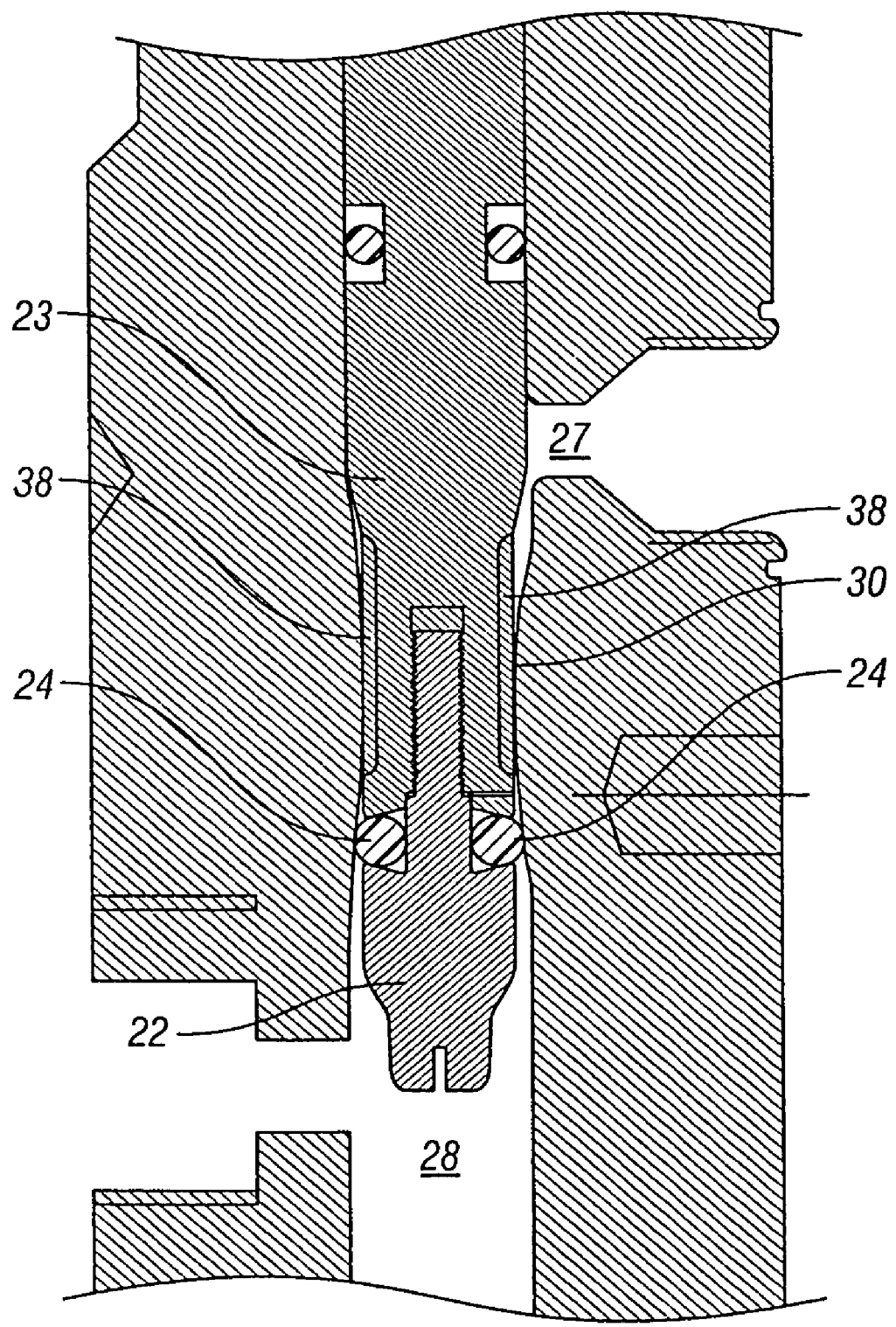
FIG. 6 is another view of the apparatus as depicted in FIG. 5, showing the stem shifted to a full closed position within the body of the valve according to the invention.

FIG. 6 depicts the stem 21 in the full closed position. Rotation of the handle 17 pulls the stem 21 from the full open to the full closed position; intermediately between these extreme positions, the annular gap between the lowermost end of the proximate stem portion 23 is continuously but gradually varied to regulate the flow of gas through the passage 52 of the nozzle 30 (FIG. 2). A marked advantage of the invention is that the o-ring seat 24 is mostly protected from contact with flowing fluid throughout the total stroke of the stem 21. Only when the seat 24 is drawn extremely near the constriction of the nozzle 30 (i.e. the transition of small radius r to large radius R (FIG. 2)) does system pressure slightly extrude the seat 24 from its sheltered location between the two portions 22, 23 of the stem 21 thereby to press the seat against the nozzle wall to seal the valve 40 against further fluid flow. The slightly extruded, mildly bulging seat 24 has the sealing contact with the body wall, as seen in FIG. 6, to effectuate the full closed condition for the valve. The stem position depicted in FIG. 6 corresponds to the situation where the top end of the stem barrel 31 abuts the upper stop 67 (FIG. 1). Contact of the top of the stem 21 with the close stop 67 prevents any torque supplied through the handle 17 to be transferred as a compressive force on the seat 24. The apparatus thus prevents damage to the seat 24 as a result of over-torque of the handle 17, a serious problem in most known systems.

The recession of the seat 24 provides a measure of protection for the seat from direct impact thereon of gas flow through the nozzle passage 52 from the first 30 chamber 28 to the second chamber 27 of the valve. As seen in FIGS. 4–6, the seat 24 is squeezed by the threaded distal stem 22 and is secured into the "dove-tail" pocket 56 or groove that captures and covers a large percentage of the seat. This gentle squeeze between the two pieces of the stem 21 grabs the seat, and prevents ballooning during flowing conditions. As suggested in FIG. 4, the squeeze also mildly compresses the seat 24 so that its outside diameter $D_s$ is preset to a selected diameter. In a preferred embodiment, the selected preset diameter is, for example, from about 0.224 inches to about 0.232 inches. In all embodiments, the selected seat diameter is set to dimension necessary to ensure that, when the apparatus 40 is positioned with the seat 24 near the nozzle 30, the apparatus predictably regulates flow. The dove-tail pocket 56 provides sufficient void volume 60 to allow the o-ring 24 to fill the pocket 56 when the stem 21 is positioned fully in the nozzle 30, but captures the majority of the cross-section of the o-ring 24 to provide positive retention during all stem positions.

This feature, of capturing the seat 24 around a large percentage of its toroidal circumference, also provides greater protection against ignition by substantially reducing the exposure of the seat 24 to active ignition mechanisms (i.e., flow friction, adiabatic compression, etc.).

Axial movement of the stem 21 varies the distance between the seat 24 and the lower gently curved surface of the nozzle 30, the distance variable between zero (closed, FIG. 6) and a maximum (full open, FIG. 5). During the opening of the valve 40, the harshest gas impacts are directed against the lower-most tip of the distal stem portion 22 of the stem 21, and between the metal-surrounded stem grooves 38 and the metal nozzle 30. Since the grooved portion of the proximate stem 23 and the nozzle 30 each preferably are made from a durable metal, all the throttling of the gas during a charging flow or a discharging flow through the valve 40 advantageously occurs between the comparatively damage- and combustion- resistant metal grooves 38 and metal nozzle 30 defined by the body 20. This is an improvement over known devices, where throttling of the gas typically occurs between a nozzle and a relatively fragile and combustible nonmetal valve seat 24.

Opening the valve 40, axial movement of the distal portion 22 of the stem 21 into the first chamber 28 retracts the seat 24 from the bore wall, and increases the distance between the lower end of the proximate stem portion 23 and the nozzle 30, and the rate of dilation of that distance increases with continuing rotation of the handle 17. Due to the positional relationships of the stem's surface and the curved surface of the nozzle 30, the rate of dilation of the distance there-between does not accelerate in the rapid fashion characteristic of known valves. Rather, the initial rotation of the handle 17 separates the seat 24 from the high pressure side of the nozzle 30, but simultaneously induces first a gradual departure of the stem 21 from the curved surface of the nozzle 30. In this manner, the danger of a sudden, sonic velocity "rush" of gas from the high pressure zone 42 through the passage 52 to the zone of lower pressure 43 is substantially and advantageously reduced.

The o-ring seat 24 is subjected to "ballooning" forces anytime the seat 24 is close to the nozzle 30. These flow forces create a pressure differential across the seat's cross section that tends to enlarge the seat's diameter (i.e., "balloon" the o-ring). In order to control these forces, the configuration of the pocket 56 and the location of the stem shoulder 46 provide that, when the distal stem 22 is screwed completely into the proximate stem 23, the o-ring seat 24 is subjected to a predetermined squeeze, fully capturing the seat. This configuration stabilizes the seat, and effectively eliminates uncontrolled extrusion, with an o-ring hardness of approximately 90 durometer.

The pressure equalization vent hole 37 helps equalize pressure differentials across the seat 24 during dynamic flow conditions. Since flowing gases cause a reduction in static pressure, the inside and outside diameters of the seat 24 are subjected to a differential pressure, thus exaggerating the potentially deleterious "ballooning" forces. The pressure equalization vent 37 bleeds off the pressure differential to reduce these forces.

The apparatus 40 very preferably employs a 90-durometer elastomeric seat 24. Provided that 90-durometer seats are utilized, long cycle life is assured without excessive o-ring extrusion. Non-metallic materials can be adapted with different suitable properties for application in virtually any fluid media and pressure, including very high pressure.

The apparatus thus allows standard o-rings (including those composed of otherwise undesirable materials due to combustion toxicity) to be used in a valve seat 24 where flow must be initiated and also shut off repeatedly. Oxygen-compatible o-rings tend to balloon out with pressure application or to extrude under gas flow. Because the two-piece stem 21 effectively captures and squeezes the seat 24 while still providing sufficient void volume 60 to repeatedly load and unload (i.e., gives the o-ring somewhere to go when loading), an elastomeric o-ring can be reliably used as a valve seat. The invention allows common elastomeric o-rings to be used in a functional way as a high-pressure valve seat (loaded and unloaded), and is appropriate for many different applications. These features allow for many different implementations for the use of standard o-rings to be used as a seating mechanism.

It was determined that the stem 21 requires guidance by two-point contact (upper and lower contact points) throughout its full stroke. In one preferred embodiment, associated with previously offered exemplary dimensions, the total stem stroke is approximately 0.157 inches. In the absence of two-point guidance, the stem 21 moves and creates wear on the stem and extrusion failure of the o-ring seat 24. Accordingly, the present invention provides two-point guidance throughout the stroke of the valve. The guidance mechanism ensures that the stem 21 stays centered in the valve bore throughout its full stroke, thereby reducing frictional wear of the stem 21. The guidance also ensures that the seat o-ring 24 moves smoothly into and out of the nozzle 30, minimizing the extrusion clearance during the stroke.

The lower stem guidance is accomplished by maintaining the stem diameter slightly under the body nozzle diameter (minimum diametrical clearance) and adding flow grooves 38 to the proximate stem portion 23. The grooves 38 are configured to flow the same volumetric quantity of gas that the original design allowed, but since the grooves 38 are spaced around the circumference of the stem 21, the guidance provided by the close tolerances of the stem/nozzle diameters is maintained. The grooves 38 are positioned so that the increasing flow area does not develop until the valve undergoes the stroke of a full turn, consistent with the original design of U.S. Pat. No. 6,607,007. An added benefit of the grooves 38 is the heat rejection they induce, and their hindrance to flow impingement on the seat 24 for any reverse flow condition.

Since clearances must be maintained at a minimal level to control extrusion failure of the o-ring 24, careful stem guidance ensures that the o-ring 24 does not have excessive clearance on any one side of the stem 21 due to the stem canting within the bore due to dynamic flow forces. To accomplish this, the proximate stem portion 23 is grooved to maintain the high gas flow area desired, while still maintaining guidance and tight clearances between stem 21 and wall of the body 20. In a preferred embodiment, the outside diameter of the proximate stem portion 23 in the region of the grooves 38, is approximately 0.206 inches, while the minimum inside diameter of the nozzle 30, at the narrowest passage, is approximately 0.208 inches. Accordingly, the difference between the diameter of the stem 21 where it passes through the nozzle 30, and the diameter of the nozzle 30 itself, preferably is about 0.002 inches, or about one thousandth of an inch on each diametric side of the stem. Preferably, the nominal diameter of the proximate stem portion 23 is at least 98% of the nozzle minimum diameter, the close tolerance needed to provide the second point of guidance for the stem 21. This close tolerance between stem 21 and the nozzle 20 prevents significant lateral movement of the stem, and provides the lower point of the "two point" stem guidance. The stem thus tends to open and close with little or no crooked canting within the bore, and undergoes little flutter during dynamic flow.

The grooves 38 are positioned so that they do not affect the flow until after at least one opening turn of the 17 to provide the desirable slow-opening feature. An added benefit of the grooves 38 and maintenance of tight tolerances is that the grooves 38 increase the turbulence during reverse pressurization of the valve 40 (such as would occur during cylinder filling operations). This turbulence, as well as the close tolerances, greatly reduces the effective heating of adiabatic compression since it increases mixing between the low and high pressure gases.

An added benefit of the dual point guidance feature is that the guidance mechanism (the shaft of the proximate stem 23 that features the grooves 38), occupies the passage 52 through the nozzle 30 so that any flow into, or out, of the valve 40 is forced past metallic elements 23 that nearly filled the flow path (the passage 52 through the nozzle 30) for the entire stroke of the valve. This feature offers improved protection for the seat 24 against any ignition mechanisms or combustion process and reduces the quantity of combustion products ejected, by creating flow resistance/turbulence and increased heat rejection. In particular: (1) adiabatic compression heating effect through the valve outlet 50 is reduced—since the heat delivered to the seat by this mechanism is best rejected by metallic elements; (2) combustion product emission at the outlet bore is reduced—since the metallic elements are better suited to reject the heat of combustion of the seat 24 which causes combustion products to flow out of the valve past the metallic elements, which would reject much of the heat produced by the small seat 24; and reduce the concentration of combustion products at the outlet port 50 by cooling those products as they travel to the outlet.

Thus, the stem 21 stem is designed with several features to capture the seat 24, squeeze the seat 24, guide the stem, and provide for the necessary gaseous flow area. A two-piece stem 21 permits squeezing of the seat 24 as discussed previously. The stem flow grooves 38 are preferable to maintain the flow area (channels), while yet providing positive guidance of the lower stem 21 as discussed previously (i.e., the lower portion of the stem cannot "sway" or flutter during flow).

The two-piece stem 21 allows the use of anti-extrusion o-rings, or even plastics, since they do not have to be stretched over the retainer to be positioned into the gland or seat pocket. In most cases, anti-extrusion materials, including plastics, have minimal "memory" and tend to deform plastically when stretched. So, with the inventive two-piece stem, many types of seating materials with appropriate properties can be utilized (both elastomeric materials and plastics).

The long radius nozzle transition R smoothes the extrusion transients acting on the seat 24. The nozzle 24 is profiled with a smooth radius R for the loading of the stem 21 into the upper nozzle, for finer flow control past the lower nozzle during the early stages of valve opening, and to extend the cycle life of the seat 24. The smooth radius (lower) provides for smooth movement of the seat 24 into and out of the nozzle 30, and is designed for a large radius transition. The large radius transition R allows for gradual transition from a no-flow to flow condition, thereby reducing downstream pressurization rates (minimizing adiabatic compression to downstream components). The gradual transition also reduces the extrusion tendency of the o-ring 24 and increases the overall cycle life. This feature is significant to the success of the o-ring seat 24, and functions in a complimentary manner to the squeeze/capture features already discussed.

In order to ensure that the stem 21 does not rotate during adjustment of the apparatus, a pin 35 is provided in the proximate stem portion 23 to allow for only axial movement (up and down), as seen in FIGS. 1 and 1A. The pin 35 provides linear guidance of the stem 21 and distributes the torsional loading along the entire length of the pin. The pin 35 is a stainless steel (or other appropriate material) small-diameter rod inserted the hole 33 on one side of the valve-regulator. The hole 33 is drilled into the body 20 and proximate stem portion 23, and provides a raising/lowering guide for the lower stem and prevents rotation during opening and closing of the valve. The pin 35 occupies a minimum of the limited available space, while providing for non-rotational guidance throughout the travel range of the valve.

It is seen, therefore, that the unique seat sealing mechanism of the apparatus 40 inherently requires minimal torque to close the valve. Once the valve seat 24 is within the nozzle 30, the seat self-actuates in a controlled manner, and is pressure-aided to seal the nozzle 30 against the passage of gas. This positive closure is realized by design, without excessive load on the seat material.

It also is noted that the apparatus 40 is fully serviceable from the top, without removing the apparatus from the gas cylinder, by the simple expedient of unscrewing the cap 19, which is threaded (i.e. ¾–20), to engage with the threaded exterior of the upper body 20. The ability to service the interior components of the apparatus 40 without removing it from the cylinder to which it is attached offers advantages of service length and system cleanliness. An estimated 25% of cylinder valves are destroyed due to thread stripping incurred during valve removal and replacement. Minimizing the need to detach the apparatus 40 from its associated cylinder for servicing also reduces thread wear and introduction of particulate debris into the cylinder.

The valve materials have virtually non-magnetic signature so applications with MRI equipment are allowed. The design also ensures that the flow rate from the valve is responsive to adjustment and can be easily controlled by the tactile feel/adjustment of the user.

Improvements over the original embodiment (U.S. Pat. No. 6,607,007) and the current apparatus design are mentioned. The diameter of the lower stem 21 was reduced, so that the forces applied to the adjusting screw threads are reduced. This feature increases the cycle life of the apparatus (by virtue of the reduced thread wear). The reduction in the lower stem diameter also allows for an increase in the body wall thickness, so that the valve's resistance to mechanical impact is increased (i.e., higher impact forces required before failure of the body near the body o-ring's reduced diameter).

The wall thickness was increased in the valve body 20 to provide additional structure for resistance to mechanical impact loads. Cylinders are known to fall over, or off of elevated structures, and strike rigid surfaces, thereby applying an impact load to the valve. The wall thickness in valve body in areas vulnerable to failure by this mechanism is increased. Further, either straight threads or tapered threads may be used for the device.

It also is noted that the handle adjusting mechanism 17 is a fully captured 10 mechanism. The captured threads ensure that any debris produced by the threads during service is captured by the stem barrel 31. The present arrangement also includes a finer thread pitch (for finer valve adjustment) and a greater number of engaged threads (lowering the overall thread stress and wear). The captured threads eliminate the "dove-tail" of the original design that had a tendency to spread the threads and increase thread wear. The captured thread design also eliminates the need for left-hand threads, and allows normal right-hand threads to be used for the entire adjusting mechanism. The guide pin 35 was added to provide positive non-rotation of the lower stem during valve opening and closing.

The apparatus' configuration ensures long life of the valve through consistent low load, smooth sliding, seating and unseating, when the valve is opened or closed. The seating is independent of, and protected from, potentially abusive user hand torque inputs. This is in contrast to non-o-ring seated valves, which rely on hand torque that forces a metallic component into high force, high stress, contact with the seat polymer, resulting in progressive deformation and extrusion of the seat polymer to an ever changing shape or configuration. This results in seat wear, shredding, and extrusion displacement and the need for the seat to act as the valve closing stop, exposing it to potential user abuse from hand over-torque.

The body cap 19 was altered to engage the body 20 on the outside to provide additional room to accommodate the upper stem and for the lower stem drive.

The seat o-ring 24 and stem seal o-ring 55 (especially without backup ring seals) feature reduced sizes to provide a minimum quantity of polymer should combustion ever develop. It is known that polymers are the weakest link in any design, from a combustion standpoint, and should an ignition occur, polymer combustion can lead to metals ignition as well as the generation of toxic combustion products. The metals chosen for this design have demonstrated excellent compatibility. The o-ring materials are here chosen since they provide excellent compatibility and are minimized in size to greatly reduce the quantity of heat and toxic products produced if ignition should occur. For example, in a preferred embodiment of the invention, the seat 24 may have a mass of about 30 mg of material that burns with 3300 cal/g, so that an accidental combustion would generate about 99 calories of energy. In contrast, conventional Sherwood-style valves have seats typically having a mass of 100 mg of a substance that burns with 7,500 cal/g, and thus yield 750 calories of energy in the event of combustion. The reduced mass, and comparatively lower energy of combustion, of the seats useable in the inventive apparatus thus pose a reduced combustion hazard, and likely a comparatively lower toxicity of combustion in the event of a combustion accident due to the use of a minimized mass of material.

Accordingly, polymer materials can be chosen for their superior compatibility with oxygen, but since burning polymers are known to produce toxic combustion products (in various quantities), the oxygen-wetted polymeric parts are maintained as small as possible (e.g., to reduce the amount of toxic combustion products that could be produced). The stem seal is reduced to a single o-ring 55, eliminating the two backup rings, and the seat o-ring 24 is reduced to a minimum size. The use of an o-ring for the seat 24 provides the added benefit of eliminating all polymeric material, except for that occupying the toroidal volume (most known seats are larger volume discs of polymeric material, rather than toroidal in shape). Thus, the mass of the polymeric available for combustion is reduced by virtue of the o-ring geometry. The combustion likely also is reduced by the captured configuration of the seat, which effectively hinders ignition and propagation.

Another benefit of the inventive apparatus is provided by the close tolerance incorporated between the stem guides between the grooves 38 and the nozzle 30, which effectively cools hot combustion products exiting (or entering) the valve 40. The cooling of the combustion products by large surface area metallic components helps to condense out toxic products from the gas stream, and thus reduce the quantity that could be ingested by a patient using a flow system incorporating the valve. Accordingly, the invention inherently reduces the potential for toxic product production by minimizing the size/quantity of polymeric components, protecting them against ignition, and hindering the delivery of toxic products to downstream breathing systems by design configuration.

The inventive apparatus 40 thus improves upon the originally developed valve, and incorporates the new technology and superiority of that design. Hence the regulator extension of the valve shown in FIG. 7 incorporates the materials compatibility and risk minimization features of the valve design while implementing regulating features. Both pressure and flow regulation are possible with the present invention. The apparatus inherently ensures that the pressure biasing components (springs, etc.), which are sometimes less compatible, are maintained outside of the fluid wetted areas.

Figure 7:
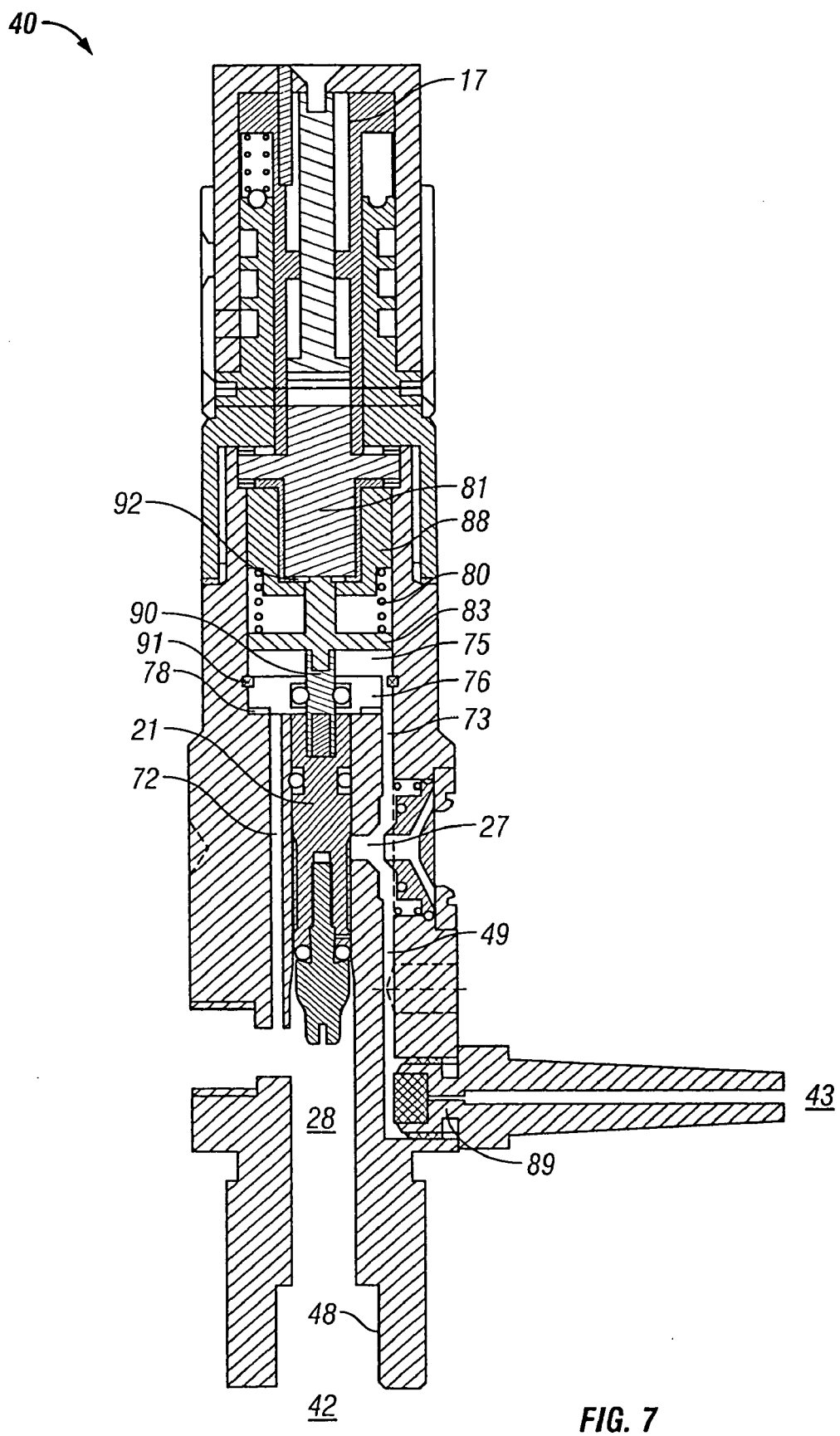
FIG. 7 is an axial (side) sectional view of an alternative embodiment of the valve-regulator according to the present invention.

FIG. 7 shows an alternative embodiment of the invention, an apparatus 40 providing improved flow regulation. The apparatus improves regulation by "balancing" the stem 21, i.e., pressure forces acting on the stem are balanced against the cylinder pressure, so that the force balance does not change with increases or decreases in the cylinder pressure. The balanced stem 21 design not only ensures that the regulated pressure/flow will not change significantly as cylinder pressure decreases (or increases), but it also ensures that the adjustment torque is maintained at a low level.

The embodiment of FIG. 7 is similar in most respects to the previously described embodiments, except for a novel manner in which the handle mechanism interacts with the stem 21. The handle 17 is rotatable in the described manner by any suitable means, and rotation of the handle imparts rotary motion to the handle cylinder 81 as well. Handle cylinder 81 has a threaded exterior threadably engaged with the correspondingly threaded interior of the barrel 88. Rotation of the handle 17 and handle cylinder 81, having screwed engagement with the barrel 88 causes the barrel to shift axially within the body 20. The functional interaction between the cylinder 81 and the barrel 88 thus is generally the same (including catching debris) as that between the handle 17 and the stem barrel 31 as described for the embodiment of FIG. 1, except that the threaded barrel 88 in this embodiment is functionally associated with the handle assembly, rather than being part of the proximate stem 23.

A coil spring 80 or other suitable biasing means extends axially between the lower or distal end of the barrel 88 and a spring flange 83. The spring flange 83 forms a stem piston, which in turn is connected to the proximate end of the stem 21. The connections between the spring flange or stem piston 83, and between the stem 21, may be reversible (as by screwed connection), but during the operation of the invention the stem 21, stem piston or spring flange 83 move axially as if a single unit. An axial extension of the spring flange 83, however, is slightly movable axially in relation to the barrel 88, to-and-fro through a central portal in the bottom of the barrel 88. That is, the threaded barrel member 88 defines a central portal in its bottom, and the central portion of the spring flange extending axially upward passes through the portal, and the extension is free to slide within the portal, and is prevented from being extracted by means of a snap ring. The compression of the balancing spring 80 urges the spring flange 83 away from the barrel 88. As in previous embodiments, the barrel 88 may shift smoothly within the body 20 and in gliding contact with its interior wall.

An axially symmetric extension shaft 90 extending from spring flange 83 passes through a positionally fixed disk 76 and attaches by threads on distal end to the top of the stem 21. This shaft 90 provides a fixed axial reference location of the spring flange 83 to the stem 21. This configuration causes both the spring flange 83 and the stem 21 to move together axially, as a functional unit, as a result of the spring force and the balance of pressures on the distal and the proximate surfaces, respectively, of these two components.

The forces on the spring flange 83 are the spring force on its proximate surface, the interstage pressure in the interstage chamber 75 on its distal surface, and the force transmitted along the axially symmetric shaft element 90, that passes through a central portal or aperture in the fixed disk 76, from the proximate portion 23 of stem 21. It is therefore an object of this invention to provide a pressure, and therefore force, balanced stem 21, in order to limit the force on the spring flange piston 83 to the spring force and the interstage pressure force (i.e., forces resulting from control pressure in the interstage chamber 75. This in turn allows the selection of a reasonably sized regulator spring 80, and an advantageously low adjustment torque of handle 17.

A conduit 72 runs between the lower chamber 28 and the distal (lower) side of the fixed disk 76. There is provided a snap ring 91 or other means, at the proximate side of the disk member 76, engageable with for example a circumferential grove in the body 20, for holding the disk member in position. The disk member is fixed axially in place by the snap ring 91 preferably at the disk's proximal interface with the body 20. The distal side of the disk member 76 effectively is in fluid communication with the lower chamber 28. The fluid pressure in the lower chamber 28 thus may act upon the distal side of the fixed disk 76 and on the proximate end of the proximal portion 23 of stem 21. Suitable packing or gaskets prevent fluid from flowing past the fixed disk 76 and the upper stem 21 past o-ring seal 55 from the conduit 72. The conduit 72 thus constantly subjects the proximal side of the stem 21 to the extant pressure of the lower chamber 28.

The forces on the stem 21 include the force from the spring flange 83 transmitted by the axially symmetric shaft element 90 through the portal in fixed disk 76 into the threaded connection at the proximal end of the stem 21. Also applied to the proximal end of the stem 21 is the pressure of the lower chamber 28, which acts through conduit 72 over the proximal areal difference between the stem 21 and the axially symmetric shaft element 90. This pressure is transmitted through conduit 72 from the lower chamber 28 to the upper end of the stem 21. The area difference between the stem 21 and the axially symmetric shaft element 90 is sized to match the area at the seat 24, which forms the distal area of stem 21, where the extant pressure in chamber 28 thereby acts on the distal end of the stem 21, 23.

A gasket seal 78 on the distal side of the fixed disk 76 precludes fluid flow (and thus pressure transmission) radially past the distal side, between any high pressure region at its inner diameter and any low pressure region at its outer diameter; resulting from pressure transmission from the high pressure zone or from the low pressure zone. A seal also prevents fluid flow between the shaft 90 and the disk 76, yet permits the shaft 90 to shift axially through the central portal of the disk.

This design configuration causes the stem 21, 23 to be pressure balanced and thereby not be subject to axial movement regardless of the pressure fluctuations in the high pressure zone 42. As seen in FIG. 7, a balancing conduit 73 runs from the upper chamber 27, axially past the fixed disk 76, to open into the interstage chamber 75. The cylindrical interstage chamber 75 is a void defined circumferentially by the wall of the body 20, and on its proximate end by the distal side of the spring flange 83, and on its distal end by the proximate side of the fixed disk 76. The balancing conduit 73 provides fluid communication between the interstage chamber 75 and the upper chamber 27. Via the balancing conduit 73, the interstage chamber has substantially the same fluid pressure as the upper chamber 27. This design results in a spring flange piston 83 and stem 21 that are in axial force balance as defined by the tension in the spring 80, which is set by rotation of handle 17, and the pressure in the interstage chamber 75. The dialed in spring force caused by rotation of handle 17 thereby allows the pressure in the upper chamber 27 and at the outlet port 50 to be regulated as desired by the operator.

Any rotation of the handle 17 results in the axial shifting of the barrel 88 (although, as in other embodiments, the barrel itself does not rotate). The axial movement of the barrel 88 results in an increase or decrease in the compression of the balancing spring 80.

It is seen, therefore, that the pressure in the interstage chamber 75 supplies an axial force on the spring flange 83 that is directed oppositely from the force of the balancing spring 80. The balancing spring 80 biases the spring flange 83 (and thus the entire stem 21) axially downward, while the control pressure in the interstage chamber 75 biases the spring flange (and again, the entire stem) axially upward within the body 20 of the valve-regulator. There thus is provided a stem that is "balanced" between the forces of the balancing spring 80 and the control pressure existing in the interstage chamber 75 and the upper chamber 27. When the valve is fully open, of course, there is fluid communication between the upper chamber 27 and the lower chamber 28 of the valve.

The degree of handle actuation thus controls the position of the barrel 88, which determines the compression applied to the spring 80 and the position of the stem 21. Rotating the handle assembly toward an "open" position shifts the barrel 88 downward, which increases slightly the compression in the balancing spring 80 as well as opening the passage 52 (FIG. 2) to fluid flow. By opening the valve by moving the stem 21, the upper chamber 27 is placed in fluid communication (via lower chamber 28) with the zone of higher pressure 42, which, by means of the balancing conduit 73, also increases the pressure in the interstage chamber 75. The pressure on the distal side of the fixed disk 76 and the differential area at the proximal end of stem 21 substantially equals the pressure in the lower chamber 28 due to the function of piston conduit 72. Thus, the pressure on both sides of the stem 21 remains balanced, regardless of the degree of valve opening.

The balanced stem improves flow regulation. It is observed that the operator is able, by controllably "dialing" the handle (metering the handle rotation), to adjust the compression in the balancing spring 80 to offset the control pressure existing in the interstage chamber 75. (FIG. 7 shows a spring-driven incremental handle rotation metering assembly.) Since the stem functions in an environment of "neutral" pressure (i.e., the pressures on the distal and proximate sides of the stem 21 are in relative equilibrium), the flow can be accurately regulated even as the pressure in the zone of higher pressure 42 drops (e.g., lower chamber 28 or alternatively as a pressurized cylinder is discharged).

There is, in a balanced stem system, and nearly no resistance to handle rotation, since the screwed drive of the barrel 88 acts only against the regulator spring in atmospheric pressure and does not act against the control pressure of the system. This flow regulation can be further enhanced by a variable orifice discharge assembly 89 of any suitable configuration. Moreover, for the practicing of the present invention, the assembly 89 very preferably includes, at a minimum, a check valve or other blanking device so that the pressure in interstage chamber 75 can be maintained during the practice of the invention. A further embodiment of the invention is the inclusion of a check valve and a quick disconnect at the discharge opening where assembly 89 is attached, or at other alternate ports of choice.

An advantage of the alternative embodiment is the provision of a novel pressure gauge built into the body of the device, so that no components protrude from the body. Conventional protruding pressure gauges have been observed to be vulnerable to impact damage and can break off during use. The pressure gauge utilizes a spring and piston design within the main body.

Figure 8:
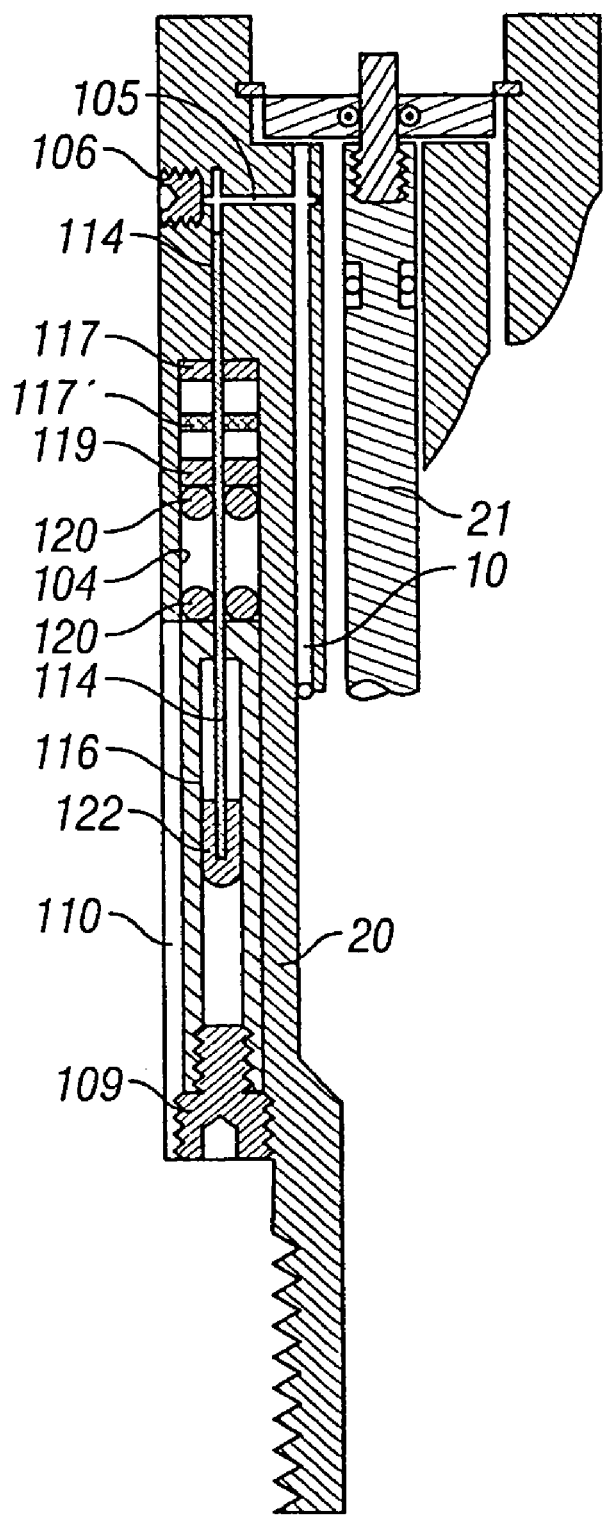
FIG. 8 is an enlarged, sectional, partial view of a portion of an alternative embodiment of the invention, showing the inclusion of a pressure gauge within the body of the valve.
Figure 8A:
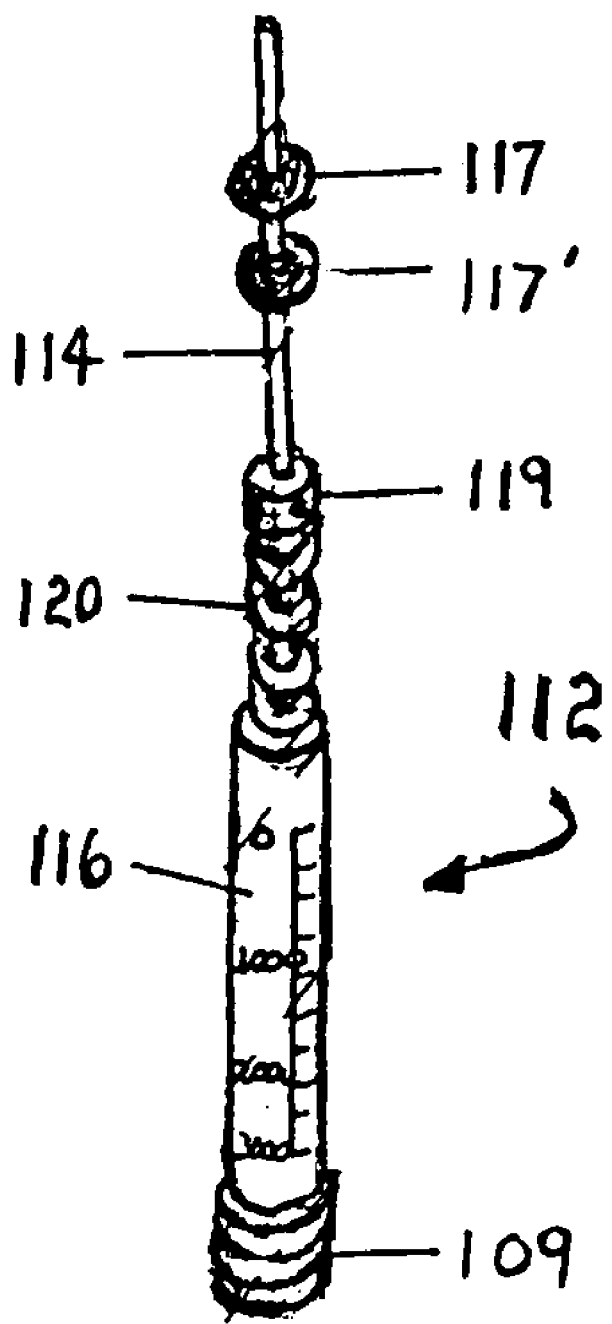
FIG. 8A is a side view of the pressure gauge assembly of the embodiment seen in FIG. 8.
Figure 9:
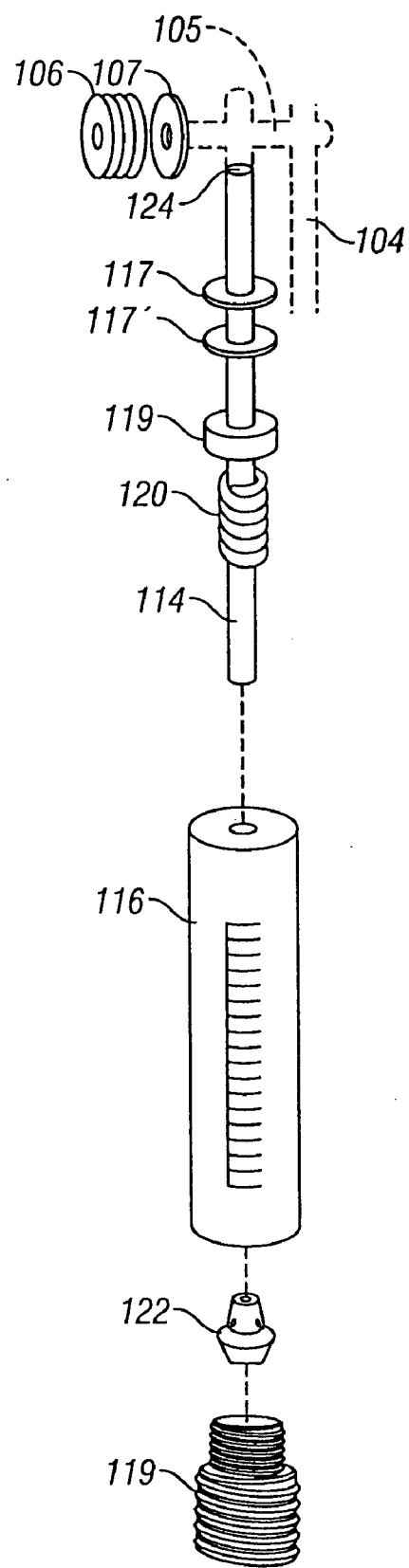
FIG. 9 is an enlarged, exploded view of the pressure gauge assembly according to the embodiment of the invention depicted in FIGS. 8 and 8A.

Combined reference is made to FIGS. 8, 9 and 9A. The pressure gauge assembly is seen in an enlarged exploded view in FIG. 9, and is depicted completely assembled in FIG. 8A. The disposition of the pressure gauge assembly within the body 20 of a valve-regulator is illustrate in FIG. 8, which shows how the assembly is fully contained in the body 20 and how the assembly is in fluid (pressure) communication with the operational components of the valve-regulator 40.

Referring to FIG. 8 it is seen that a modification of the body 20, such as the body of the embodiment of FIG. 1 or more preferably as seen in FIG. 7, is provided with a pressure passage or tap 10 is drilled or otherwise provided axially in the body 20 to expose the pressure gauge assembly to the operating pressure of the overall apparatus. The tap 10 seen in FIGS. 8 and 9, therefore, is in fluid communication with the lower chamber 28 (FIG. 1), or alternatively with the interstage chamber 75 (FIG. 7) or otherwise with the operating pressure of the valve-regulator. As seen in FIG. 8, the pressure gauge assembly is situated in an axial gauge bore 104 defined in the body 20 parallel to the stem 21 and between the stem and the exterior of the apparatus 40. A radial lateral 105 connects the proximate ends of the gauge bore 104 and the pressure tap 10. The external opening of the lateral 105 is sealed with a set screw 106 and o-ring gasket 107. A narrow slit-like window 110 is defined in the body 20 between the gauge bore 104 and the outside of the body 20, and is sealed by a transparent, high-impact plastic sleeve 116 to permit viewing into the gauge bore 104.

The assembly 112 is assembled outside the body 20 to appear as seen in FIG. 8A, and as completed is inserted into the gauge bore 104 via a bore port at the distal end of the bore 104, which then is sealed closed with a capping screw 109 which has a threaded engagement with the body at the distal end of the bore 104. The capping screw 109 preferably also screws into the threaded distal end of the transparent sleeve 116, thus securing the sleeve in place against motion. Alternatively, the sleeve 116 is glued or otherwise securely fixed in place in the distal portion of the bore 104, as seen in FIG. 8, such that the sleeve neither moves axially nor rotates during the operation of the invention.

The configuration of the pressure gauge assembly 112 is best seen in FIG. 9. A fine rod or wire 114 serves as the backbone to which other components of the pressure gauge are related. The rod 114 is movable axially within the gauge bore 104. At least one, or preferably two, o-ring seals 117, 117' sealably isolate the gauge bore 104 from the fluid pressure of the lateral 105. A cylindrical block 119 is fixedly secured, as by set-screws, staking, or the like, at a pre-determined location along the length of the rod 114. The distal end of the rod 114 is passed through a central aperture in the (otherwise closed) proximate end of the sleeve. A spring 120 is situated around the rod 114, intermediate to the block 119 and the top of the sleeve 116. After the distal end of the rod 114 is inserted into the interior of the sleeve 116, a high-visibility indicator element 122 is fixedly attached on that distal end. The rod 114, block 119, and indicator element 122 move together as a unit under the influence of the fluid pressure in the lateral 105. Because the sleeve 116 is secured in position within the gauge bore 104, the spring 120 abutting the top of the sleeve urges the block 119 axially upward. As shown in FIG. 9, the sleeve 116 has visible graduations embossed, graven, or printed thereon in appropriate units of pressure.

The length of the rod 114, and the length of the sleeve 116, are selected, and the location of the block 119 pre-determined, so that the indicator 122 registers with the proper pressure indication of the sleeve 116. In the operation of the invention, fluid pressure in a valve chamber (e.g. lower chamber 28 or alternatively upper chamber 27 or interstage chamber 75) is transmitted to the lateral 105, where the pressure exerts a force upon the proximate end 124 of the rod 114. The pressure upon the end 124 of the rod 114 tends to push the rod axially downward against the compressive force of the spring 120. The compression of the spring 120 depends, therefore, on the pressure in the lateral 105. As pressure in the valve, and thus in the lateral 105, increases, the rod 114 is urged axially downward, and the indicator 122 shifts into the proper location within the sleeve 116 to align with the indicator on the graduated scale corresponding to the elevated valve pressure (e.g. pounds per square inch). Upon a decrease in pressure in the lateral 105, the spring 120 pushes against the top of the sleeve 116 and the block 119 to urge the rod 114 axially upward. As a result of the bias of the spring 120, the rod shifts upward to draw the indicator element 122 into registration with the correct gradient on the sleeve scale corresponding to the new, reduced, valve pressure.

The valve-regulator 40 allows for an infinitely (as distinguished from incremental) adjustable flow range, even though the adjustment knob on the handle 17 may be detented for tactile feel of various adjustment levels. The apparatus can be adjusted to virtually any flow level desired within the design range of the apparatus. Two flow ranges preferably are provided based on market requirements (0–15 lpm and 0–25 lpm). Color indicators of the flow range may also be offered, so that users are provided with an easy to see visual indicator of the flow range, as well as a numerical indicator of the adjustment. The design also ensures that the flow rate from the valve is responsive to adjustment and can be easily controlled by the tactile feel/adjustment of the user over the entire range of the apparatus. Since the device allows for variable flow control, the control knob may be equipped with an electronic device such as a stepper motor to allow for applications requiring fully automatic flow adjustment. No separate shutoff knob is required for the present apparatus, but positive shutoff is provided by the same knob as for flow adjustment.

The discharge cannula is equipped with a low pressure check valve 89 to ensure that the cylinder is not depleted below a predetermined level. This feature assures that oxygen distributors can refill cylinders without having to test for ingestion of atmospheric contaminants or water. Indeed, the fill and discharge ports provided in the body are configured selectively with low pressure check valves, filters, cannula fittings, hand operated shut off valves, automatic check valves, fixed or variable orifices, fill pressure limiting check valves, quick disconnects, and standardized sealing arrangements. The discharge cannula 89 can be positioned in numerous locations on the device depending on the market requirements.

The regulator body design is presently consistent with a CGA 870 style valve body, but the internal design and operational features can be adapted to a variety of service fluids and applications. Hence, the body style and features can be developed based on the service application of interest. Pertaining to this, either straight threads or tapered threads could be used for the cylinder attachment for the device body.

The regulator provides for flow adjustment that can be finely controlled for both high and low pressure applications. Due to this advantage, and since the manufacturability is estimated to be low cost, the regulator 40 has applicability for many different applications and services such as aviation, paint ball guns, industrial gases, specialty gases, SCUBA diving, and alternative fuel vehicles to name a few. For any of these applications alternative to medical environments, the materials (metals and nonmetals) can be chosen for compatibility rather than or as well as for functionality. In contrast, most plug style designs must use materials that provide functionality only since the more compatible materials (especially nonmetallic materials) are not robust enough to endure the mechanical stresses. Therefore, non-compatible higher fire risk materials are used in plug-style designs largely because they survive their mechanically induced abuse relatively better than the compatible materials, so long as a fire does not occur.

The inventive valve/regulator combination apparatus allows for both pressure regulation and flow regulation, while maintaining the features of a valve if desired. So, all three functions are provided in the same device (flow or pressure regulation and valve features). This is believed to be unique to the present apparatus, since other components only provide one of these three features. In other words, known devices are either a valve, or a pressure regulator, or a flow regulator. The present invention may function simultaneously as a pressure regulator and valve or a flow regulator and valve. These features are attained due to the unique elements of the internal operating mechanism comprised of elements 17–38 for the valve as well as 72–90 for the valve-regulator. These critical features could be embodied within many different exterior housings to satisfy a variety of valve or valveregulator applications.

What is claimed is:

1. An apparatus for regulating the flow of a gas between a high-pressure zone and a zone of lower pressure, said apparatus comprising:
    a hollow body having an axis;
    a first chamber and a second chamber, said chambers defined within said body;
    a nozzle within said body and separating said chambers, said nozzle comprising a convexly curved wall, and defining a passage for the passage of gas between said chambers; and
    a stem movable axially within said passage and comprising:
        a distal portion extending at least partially into said first chamber;
        a proximate portion within said second chamber and extending into said passage, wherein axial movement of said stem varies the position of said proximate portion in relation to said nozzle; and
        an o-ring seat between said proximate portion and said distal portion of said stem and contactable with said nozzle to seal said passage against the passage of gas.

2. An apparatus according to claim 1 wherein said curved wall is defined by a long radius arc and said nozzle comprises a minimum diameter.

3. An apparatus according to claim 2 wherein the ratio of said long radius to said nozzle minimum diameter is between approximately 2.53:1 and approximately 2.27:1.

4. An apparatus according to claim 2 wherein a diameter of said proximate portion of said stem is at least 98% of said nozzle minimum diameter.

5. An apparatus according to claim 4 further comprising means defined in said stem for providing gas flow area between said stem and said nozzle.

6. An apparatus according to claim 5 wherein said means for providing gas flow area comprises stem flow grooves defined in said proximate portion.

7. An apparatus according to claim 1 wherein said distal portion is removably connectable to said proximate portion of said stem and wherein, when connected, said distal portion and said proximate portion define an annular pocket for receiving said o-ring seat.

8. An apparatus according to claim 7 wherein said distal portion and said proximate portion have a screwed engagement, and wherein when fully engaged said distal portion and said proximate portion squeeze said seat and capture said seat within said pocket.

9. An apparatus according to claim 8 wherein less than one third of the toroidal circumference of said seat is exposed outside said pocket.

10. An apparatus according to claim 8 wherein said o-ring seat comprises an axial cross-sectional area, and said pocket defines an axial cross sectional area from about 7% to about 10% larger than said cross-sectional area of said seat, wherein when said seat is squeezed in said pocket a void is defined in said pocket between said seat and said stem.

11. An apparatus according to claim 10 further comprising a vent hole defined in said stem for providing fluid communication between said pocket and said second chamber for balancing pressures between said pocket and said second chamber.

12. An apparatus according to claim 10 wherein said seat comprises a polymer selected from the group consisting of PTFE Teflon® polymer, CTFE Neoflon® polymer, and Viton® polymer.

13. An apparatus according to claim 10 further comprising:
    an axially directed guide hole defined between said body and said proximate portion of said stem; and
    a guide pin inserted in said guide hole thereby to prevent rotation of said proximate portion around said axis.

14. An apparatus according to claim 1 further comprising means for regulating pressure in said second chamber.

15. An apparatus according to claim 14 wherein said means for regulating pressure comprises:
    a spring flange movably disposed within said body;
    a disk member positionally fixed within said body, said spring flange and said disk member defining therebetween an interstage chamber; and
    an axially symmetric shaft passing through a portal in said fixed disk and through said interstage chamber to separably connect said spring flange to said stem.

16. An apparatus according to claim 15 further comprising an internal seal for precluding fluid flow past said disk member.

17. An apparatus according to claim 16 further comprising a gasket seal on the distal side of said fixed disk for precluding fluid flow radially past said distal side.

18. An apparatus according to claim 17 further comprising a piston conduit for conveying pressure from said first chamber to a proximate end of said proximate stem portion.

19. An apparatus according to claim 18 further comprising a balancing conduit for conveying the fluid pressure from said second chamber and past said disk member to said interstage chamber.

20. An apparatus according to claim 19 further comprising a snap ring means, engageable with a circumferential grove in said body, for holding said disk member in position.

21. An apparatus according to claim 20 wherein said spring flange is separably connected to a proximate end of said axially symmetric shaft, thereby fixably connecting said spring flange to said stem.

22. An apparatus according to claim 21 further comprising:
   a threaded barrel member defining a central portal in its bottom; and
   an axial extension from said spring flange;
wherein said extension of said spring flange passes through said portal, and said extension is free to slide within the portal.

23. An apparatus according to claim 22 further comprising flexible biasing means disposed axially between said barrel and a proximal side of said spring flange, wherein controlled compression of said biasing means selectively adjusts the force balance on said spring flange, thereby regulating pressure in said second chamber.

24. An apparatus according to claim 1 wherein said proximate portion of said stem comprises a threaded means for separably attaching said stem to an adjustment handle, said threaded means comprising barrel means for containing thread wear debris.

25. An apparatus according to claim 24 wherein said proximate portion of said stem defines an external groove for mating with a non-rotational guide pin.

26. An apparatus according to claim 25 wherein said hollow body defines, adjacent said proximate stem portion, an internal groove for mating with a non-rotational guide pin.

27. An apparatus according to claim 26 further comprising a guide pin insertable through a top of said body for mating with said stem external groove and said body internal groove throughout the axial stroke of said stem.

28. An apparatus for regulating the flow of a gas between a high-pressure zone and a zone of lower pressure, said apparatus comprising:
   a hollow body having an axis;
   a first chamber and a second chamber, said chambers defined within said body;
   a nozzle within said body and separating said chambers, said nozzle defining a passage for the passage of gas between said chambers;
   a stem movable axially within said passage and comprising:
      a distal portion extending at least partially into said first chamber;
      a proximate portion within said second chamber and extending into said passage, wherein axial movement of said stem varies the position of said proximate portion in relation to said nozzle; and
      an o-ring seat between said proximate portion and said distal portion of said stem and contactable with said nozzle to seal said passage against the passage of gas; and
   means for regulating pressure in said second chamber, comprising:
      a spring flange movably disposed within said body;
      a disk member positionally fixed within said body, said spring flange and said disk member defining therebetween an interstage chamber; and
      an axially symmetric shaft passing through a portal in said fixed disk member and through said interstage chamber to separably connect said spring flange to said stem.

29. An apparatus according to claim 28 further comprising an internal seal for precluding fluid flow past said disk member.

30. An apparatus according to claim 28 further comprising a gasket seal on the distal side of said disk member for precluding fluid flow radially past said distal side.

31. An apparatus according to claim 28 further comprising a piston conduit for conveying pressure from said first chamber to approximate end of said proximate stem portion.

32. An apparatus according to claim 31 further comprising a balancing conduit for conveying the fluid pressure from said second chamber and past said disk member to said interstage chamber.

33. An apparatus according to claim 32 further comprising a snap ring means, engageable with a circumferential grove in said body, for holding said disk member in position.

34. An apparatus according to claim 32 wherein said spring flange is separably connected to a proximate end of said axially symmetric shaft, thereby fixably connecting said spring flange to said stem.

35. An apparatus according to claim 34 further comprising:
   a threaded barrel member defining a central portal in its bottom; and
   an axial extension from said spring flange;
wherein said extension of said spring flange passes through said portal, and said extension is free to slide within the portal.

36. An apparatus according to claim 35 further comprising flexible biasing means disposed axially between said barrel and a proximal side of said spring flange, wherein controlled compression of said biasing means selectively adjusts the force balance on said spring flange, thereby regulating pressure in said second chamber.

37. An apparatus for regulating the flow of a gas between a high-pressure zone and a zone of lower pressure, said apparatus comprising:
   a hollow body having an axis;
   a first chamber and a second chamber, said chambers defined within said body;
   a nozzle defined by a convexly curved wall within said body and separating said chambers, said nozzle defining a passage for the passage of gas between said chambers; and
   a stem movable axially within said passage and comprising:
      a distal portion extending at least partially into said first chamber;
      a proximate portion within said second chamber and extending into said passage, wherein axial movement of said stem varies the position of said proximate portion in relation to said nozzle;

stem flow grooves defined in said proximate portion for providing gas flow area between said stem and said nozzle; and an o-ring seat between said proximate portion and said distal portion of said stem and contactable with said nozzle to seal said passage against the passage of gas.

38. An apparatus according to claim 37 wherein said curved wall is defined by a long radius arc and said nozzle comprises a minimum diameter.

39. An apparatus according to claim 38 wherein the ratio of said long radius to said nozzle minimum diameter is between approximately 2.53:1 and approximately 2.27:1.

40. An apparatus according to claim 38 wherein a diameter or said proximate portion of said stem is at least 98% of said nozzle minimum diameter.

41. An apparatus for regulating the flow of a gas between a high-pressure zone and a zone of lower pressure, said apparatus comprising:

a hollow body having an axis, said hollow body defining, adjacent said proximate stem portion, an internal groove for mating with a non-rotational guide pin;

an adjustment handle;

a first chamber and a second chamber, said chambers defined within said body;

a nozzle within said body and separating said chambers, said nozzle having a minimum diameter and defining a passage for the passage of gas between said chambers; and a stem movable axially within said passage and comprising:

a distal portion having a diameter less than said minimum diameter of said nozzle, said distal portion extending at least partially into said first chamber;

a proximate portion, within said second chamber, removably connectable to said distal portion and extending into said passage, wherein axial movement of said stem varies the position of said proximate portion in relation to said nozzle;

wherein said proximate portion of said stem comprises a threaded means for separably attaching said stem to said adjustment handle, said threaded means comprising barrel means for containing thread wear debris and wherein further said proximate portion of said stem defines an external groove for mating with a non-rotational guide pin;

a guide pin insertable through a top of said body for mating with said stem external groove and said body internal above throughout the axial stroke of said stem; and an o-ring seat between said proximate portion and said distal portion of said stem and contactable with said nozzle to seal said passage against the passage of gas.

* * * * *